United States Patent
Imber et al.

(10) Patent No.: US 10,055,826 B2
(45) Date of Patent: Aug. 21, 2018

(54) SYSTEMS AND METHODS FOR PROCESSING IMAGES OF OBJECTS USING COARSE SURFACE NORMAL ESTIMATES

(71) Applicant: Imagination Technologies Limited, Kings Langley (GB)

(72) Inventors: James Imber, Kings Langley (GB); Adrian Hilton, Surrey (GB); Jean-Yves Guillemaut, Surrey (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/335,567

(22) Filed: Oct. 27, 2016

(65) Prior Publication Data

US 2017/0116737 A1    Apr. 27, 2017

(30) Foreign Application Priority Data

Oct. 27, 2015 (GB) .................... 1518957.4

(51) Int. Cl.
| | |
|---|---|
| *G06K 9/36* | (2006.01) |
| *G06T 5/20* | (2006.01) |
| *G06T 7/60* | (2017.01) |
| *G06T 15/04* | (2011.01) |
| *G06T 15/80* | (2011.01) |

(Continued)

(52) U.S. Cl.
CPC ............... *G06T 5/20* (2013.01); *G06T 7/60* (2013.01); *G06T 7/90* (2017.01); *G06T 15/04* (2013.01); *G06T 15/80* (2013.01); *G06T 2200/04* (2013.01); *G06T 2200/28* (2013.01); *G06T 2207/10016* (2013.01); *G06T 2207/10024* (2013.01); *G06T 2207/10028* (2013.01); *G06T 2207/20028* (2013.01); *H04N 9/07* (2013.01); *H04N 13/204* (2018.05)

(58) Field of Classification Search
USPC ........................................... 345/426
See application file for complete search history.

(56) References Cited

U.S. PATENT DOCUMENTS

| 5,410,358 A * | 4/1995 | Shackleton ............ H04N 7/014 |
| | | 348/441 |
| 7,230,620 B2 * | 6/2007 | Pfister .................... G06T 13/20 |
| | | 345/426 |

(Continued)

OTHER PUBLICATIONS

Hudon et al., European Patent Publication EP3151190 A1.*

(Continued)

*Primary Examiner* — Xuemei Chen
(74) *Attorney, Agent, or Firm* — Vorys, Sater, Seymour and Pease LLP; Vincent M DeLuca

(57) ABSTRACT

An image processing system and method for determining a set of surface normals of one or more objects for use in rendering the object(s) is described. One or more input images are received, each representing a view of the object(s). A depth image is received representing depth values of the object(s). Coarse surface normal estimates are determined based on depth values of the received depth image. The set of surface normals are determined by applying bilateral filtering to the coarse surface normal estimates. The bilateral filtering uses bilateral filtering guidance terms based on luminance values derived from the input image, wherein the determined set of surface normals are for use in rendering the object(s).

12 Claims, 10 Drawing Sheets

(51) Int. Cl.
  G06T 7/90      (2017.01)
  H04N 13/204    (2018.01)
  H04N 9/07      (2006.01)

(56) References Cited

U.S. PATENT DOCUMENTS

| | | | | |
|---|---|---|---|---|
| 7,590,276 B2* | 9/2009 | Delaney | G06T 7/0004 | 348/142 |
| 7,995,059 B1* | 8/2011 | Arvo | G06T 15/506 | 345/419 |
| 8,466,917 B2* | 6/2013 | Benitez | G06T 15/506 | 345/419 |
| 8,532,425 B2* | 9/2013 | Ali | G06T 3/4007 | 382/260 |
| 8,737,738 B2* | 5/2014 | Wang | G06T 5/009 | 382/162 |
| 8,860,880 B2* | 10/2014 | Knee | G06T 3/40 | 348/441 |
| 8,878,906 B2* | 11/2014 | Shotton | G06K 9/00375 | 348/46 |
| 8,947,430 B1* | 2/2015 | Green | G06T 13/20 | 345/426 |
| 9,373,189 B2* | 6/2016 | Langguth | G06T 15/506 | |
| 9,477,307 B2* | 10/2016 | Chizeck | G06F 3/016 | |
| 9,607,429 B2* | 3/2017 | Imber | G06T 15/506 | |
| 9,830,042 B2* | 11/2017 | Ludwig | G06F 3/04815 | |
| 2008/0309662 A1* | 12/2008 | Hassner | G06K 9/20 | 345/419 |
| 2013/0120385 A1* | 5/2013 | Krishnaswamy | G06T 15/50 | 345/426 |
| 2014/0092109 A1* | 4/2014 | Saulters | G09G 5/363 | 345/522 |
| 2014/0354645 A1* | 12/2014 | Imber | G06T 15/60 | 345/426 |
| 2014/0368506 A1* | 12/2014 | Abbott | G06T 11/001 | 345/426 |
| 2015/0078449 A1* | 3/2015 | Diggins | H04N 7/0127 | 375/240.16 |
| 2016/0042556 A1* | 2/2016 | Imber | G06T 7/408 | 345/426 |
| 2016/0260247 A1* | 9/2016 | Fursund | G06T 15/06 | |

OTHER PUBLICATIONS

Imber, J., et al., "Intrinsic textures for relightable free-viewpoint video," In Proceedings of the European Conference on Computer Vision (ECCV), Sep. 2014.*
Lee, K., et al., "Feature-Preserving Mesh Denoising via Bilateral Normal Filtering," Ninth International Conference on Computer Aided Design and Computer Graphics, Dec. 2005.*
Tappen et al. "Recovering Intrinsic Images from a Single Image" 2005.
Song et al. "Tracking Revisited using RGBD Camera: Unified Benchmark and Baselines" 2013.
Wu et al "High-quality shape from multi-view stereo and shading under general illumination" Jun. 2011.
Wu et al "Shading-based Dynamic Shape Refinement from Multi-view Video under General Illumination". Nov. 2011.
Zhao et al "A Closed-form Solution to Retinex with Non-local Texture Constraints" Journal of Latex Class Files, vol. 1, No. 8, Aug. 2002, pp. 1-9.
Butler et al. "A Naturalistic Open Source Movie for Optical Flow Evaluation" ECCV 2012, Part VI, LNCS 7577, pp. 611-625, 2012.
Kimmel et al. "A Variational Framework for Retinex" International Journal of Computer Vision 52(1), Jul. 23, 2003.
Zang et al "Augmented Reality Using Full Panoramic Captured Scene Light-Depth Maps" 2012.
Karsch et al. "Automatic Scene Inference for 3D Object Compositing" ACM Transactions on Graphics, vol. 28, No. 4, Article 106, Publication Date: Aug. 2009.
Barron et al. "Intrinsic Scene Properties from a Single RGB-D Image" CVPR '13 Proceedings of the 2013 IEEE conference on Computer Vision and Pattern Recognition, pp. 17-24.
Barrow et al. "Recovering Intrinsic Scene Characteristics from Images", Computer Vision Systems, A Hanson and E. Riseman (Eds.) Academic Press, 1978, pp. 3-26, New York.
Basri et al "Photometric Stereo with General, Unknown Lighting", International Journal of Computer Vision 72(3), 2007, pp. 239-257, USA.
Bousseau et al "User-Assited Intrinsic Images" ACM Transactions on Graphics, vol. 28, No. 5, Article 130, Dec. 2009, pp. 130:1-130:10, New York, NY.
Budd et al, "Global Non-Rigid Alignment of Surface Sequences", Centre for Vision, Speech and Signal Processing, University of Surrey, Guildford, Surrey, Gut 7Xh, UK, pp. 1-17.
Buehler et al, "Unstructered Lumigraph Rendering", Proceedings of the 28th annual conference on computergraphics and interactive techniques, 2001, pp. 425-432.
Cagniart et al "Iterative Mesh Deformation for Dense Surface Tracking", IEEE 12th International Conference on Computer Vision Workshops, 2009, pp. 1465-1472, Japan.
Richardt et al "Coherent Spatiotemporal Filtering, Upsampling and Rendering of RGBZ Videos" vol. 31, 2012.
Horn "Determining Lightness from an Image" Computer Graphics and Image Processing, 1974, pp. 277-299.
Matsushita et al. "Estimating Intrinsic Images from Image Sequences with Biased Illumination" 2004.
Debevec et al. "Estimating Surface Reflectance Properties of a Complex Scene under Captured Natural Illumination" USC ICT Technical Report ICT-TR-06-2004. pp. 1-11.
Lee et al. "Estimation of Intrinsic Image Sequences from Image + Depth Video" 2012. pp. 1-14.
Felzenszwalb et al. "Efficient Graph-Based Image Segmentation" International Journal of Computer Vision 59(2), 167-181, 2004.
Furukawa et al. "Accurate, Dense, and Robust Multi-View Stereopsis", vol. 1, No. 1, Aug. 2008.
Barron et al. "High-Frequency Shape and Albedo from Shading using Natural Image Statistics" IEEE Computer Society Conference on Computer Vision and Pattern Recognition Jul. 2011.
Scharstein et al. "High-Resolution Stereo Datasets with Subpixel-Accurate Ground Truth" 2014.
Lensch et al. "Image-Based Reconstruction of Spatial Appearance and Geometric Detail" pp. 1-27. 2003.
Imber et al "Intrinsic Textures for Relightable Free-Viewpoint Video", pp. 1-16, 2014.
Enns et al. "Influence of Scene-Based Properties on Visual Search" Science, vol. 247, pp. 721-723, 1990.
Bonneel et al. "Interactive Intrinsic Video Editing" 2014.
Gibson et al. "Interactive Rendering with Real-World Illumination" 2000.
Garces et al. "Intrinsic Images by Clustering" vol. 31 (2012), No. 4.
Kong et al. "Intrinsic Video" 2014.
Ye et al. "Intrinsic Video and Applications" ACM Transactions on Graphics, vol. 33, No. 4, Article 80, Publication Date: Jul. 2014.
Aittala "Inverse lighting and photorealistic rendering for augmented reality" pp. 669-678, published online Apr. 14, 2010.
Laffont et al "Coherent Intrinsic Images from Photo Collections", ACM Transactions on Graphics 31, 6 (2012). hal-00761123, version Dec. 1-5, 2012.
Land et al. "Lightness and Retinex Theory", vol. 61, No. 1, Jan. 1-11, 1971.
Li et al. "Capturing Relightable Human Performances under General Uncontrolled Illumination" vol. 32 (2013), No. 2. pp. 275-284.
Li et al "Free-viewpoint video relighting from multi-view sequence under general illumination", Machine Vision and Applications, DOI 10.1007/s00138-013-0559-0, published online: Nov. 15, 2013.
Debevec et al. "Modeling and Rendering Architecture fromPhotographs: A hybrid geometry- and image-based approach" 1996, pp. 1-10.
Duchene "Multi-View Intrinsic Images of Outdoors Scenes with an Application to Relighting" ACM Transactions on Graphics, 2015, pp. 1-16.

(56) References Cited

OTHER PUBLICATIONS

Ostrovsky et al. "Perceiving illumination inconsistencies in scenes" Perception, 2005, vol. 34, pp. 1301-1314.
Ramamoorthi et al. "On the relationship between radiance and irradiance: determining the illumination from images of a convex Lambertian object" J. Opt. Soc. Am. A/vol. 18, No. 10, Oct. 2001.
Jensen et al. "Real-Time Image Based Lighting for Outdoor Augmented Reality Under Dynamically Changing Illumination Conditions" 2006.
Gehler et al. "Recovering Intrinsic Images with a Global Sparsity Prior on Reflectance" 2011.
Lombardi et al. "Reflectance and Natural Illumination from a Single Image" 2012.
Shen et al. "Re-Texturing by Intrinsic Video" Information Sciences 281 (2014) 726-735.
Theobalt et al. "Seeing People in Different Light—Joint Shape, Motion, and Reflectance Capture" IEEE Transactions on Visualization and Computer Graphics, vol. 13, No. 3, May/Jun. 2007.
Pham et al. "Separable Bilateral Filtering for Fast Video Preprocessing" 2005.
Yang et al. "Shadow Removal Using Bilateral Filtering" IEEE Transactions on Image Processing, vol. 21, No. 10, Oct. 2012, pp. 4361-4368.
Barron et al. "Shape, Albedo, and Illumination from a Single Image of an Unknown Object" 2012, pp. 1-8.
Shen et al "Intrinsic Image Decomposition Using Optimization and User Scribbles", IEEE Transactions on Cybernetics, vol. 43, No. 2, Apr. 2013, pp. 425-436.
Shen et al "Intrisnsic Images Decomposition Using a Local and Global Sparse Representation of Reflectance", Institute for Infocomm Research, pp. 697-704.
Ahmed et al. "Saptio-temporal Reflectance Sharing for Relightable 3D Video" 2007.
Starck et al. "A Free-Viewpoint Video Renderer" vol. 14, No. 3: 57-72, 2009.

* cited by examiner

SYSTEMS AND METHODS FOR PROCESSING IMAGES OF OBJECTS USING COARSE SURFACE NORMAL ESTIMATES

BACKGROUND

An image of one or more objects in a scene can be captured from the viewpoint of a camera. For example, the image may be a visual image, e.g. representing the visual appearance of the objects in the scene, e.g. in a format using Red, Green and Blue (RGB) values for pixels of the image, or in a format using luma and chrominance values (e.g. YUV). In some cases there may be more than one camera capturing different images of a scene. Each image of the scene represents a view of the scene from the viewpoint of the respective camera. The images may represent frames of a video sequence.

As well as capturing the visual input images, depth images may be captured representing the distances to points in the scene from the camera as a function of pixel position. Depth cameras for capturing depth images are known in the art, and may for example work by projecting a pattern of infrared light into a scene and inferring depth from the disparity introduced by the separation between projector and sensor (this is known as a structured light approach). Alternatively, depth cameras may use a time of flight approach to determine depths by measuring the time taken for rays of infrared light to reflect back to the sensor using interference, and from this inferring the depth of points. As another alternative, depth images can be acquired from a scene reconstruction which is registered to the scene, given knowledge of the camera calibration, for example by rendering the distance to points in the scene by means of a depth buffer.

Images are produced by the interaction of light with the surfaces of objects in a scene. If the surface properties that produce an image, or set of images, can be found, then the image of the scene can be manipulated (e.g. relit under arbitrary lighting conditions) using conventional computer rendering techniques. Albedo (which may be referred to as "intrinsic colour"), shading, surface normals and specularity are examples of intrinsic surface properties, and techniques that estimate these from one or more images are known in the art as "intrinsic image methods". Similarly, the extension to video is known as "intrinsic video". It can help to simplify the problem of estimating the intrinsic surface properties to assume that the objects are non-specular and that the scene lighting is diffuse.

Input images captured by cameras have implicit real-world lighting information, such that lighting artefacts are present (i.e. "baked-in") in the images. In order to relight the objects shown in an input image, an image processing system can attempt to split the image values (i.e. pixel values) of an input image into a shading component and an intrinsic colour component of the objects in the image. The intrinsic colour component can be used for rendering the objects under different lighting conditions. The splitting of the image values into shading components and intrinsic colour components is not a simple task. Therefore, typically, such image processing is performed "off-line" in a post-processing step after the images have been captured because the amount of time and/or processing resources required is typically large. Furthermore, this image processing is normally limited to static scenes, rather than performed on video sequences of moving objects.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided an image processing system configured to determine a set of surface normals of one or more objects for use in rendering the one or more objects, the image processing system being configured to receive one or more input images each representing a view of the one or more objects, and to receive a depth image representing depth values of the one or more objects, the image processing system comprising surface normal logic configured to: determine coarse surface normal estimates based on depth values of the received depth image; and determine the set of surface normals by applying bilateral filtering to the coarse surface normal estimates, said bilateral filtering using bilateral filtering guidance terms based on luminance values derived from the input image, the determined set of surface normals being for use in rendering the one or more objects.

There is provided a method of determining a set of surface normals of one or more objects for use in rendering the one or more objects, the method comprising: receiving one or more input images each representing a view of the one or more objects; receiving a depth image representing depth values of the one or more objects; determining coarse surface normal estimates based on depth values of the received depth image; and determining the set of surface normals by applying bilateral filtering to the coarse surface normal estimates, said bilateral filtering using bilateral filtering guidance terms based on luminance values derived from the input image, the determined set of surface normals being for use in rendering the one or more objects.

There may be provided computer readable code adapted to perform the steps of any of the methods described herein when the code is run on a computer. The computer readable code may be encoded on a computer readable storage medium.

Furthermore, there may be provided a method of manufacturing, at an integrated circuit manufacturing system, an image processing system according to any of the examples described herein. In particular, there may be provided an integrated circuit definition dataset that, when processed in an integrated circuit manufacturing system, configures the system to manufacture an image processing system according to any of the examples described herein. For example, the image processing system may be embodied in hardware and configured for performing any of the methods described herein. The integrated circuit definition dataset may be stored on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
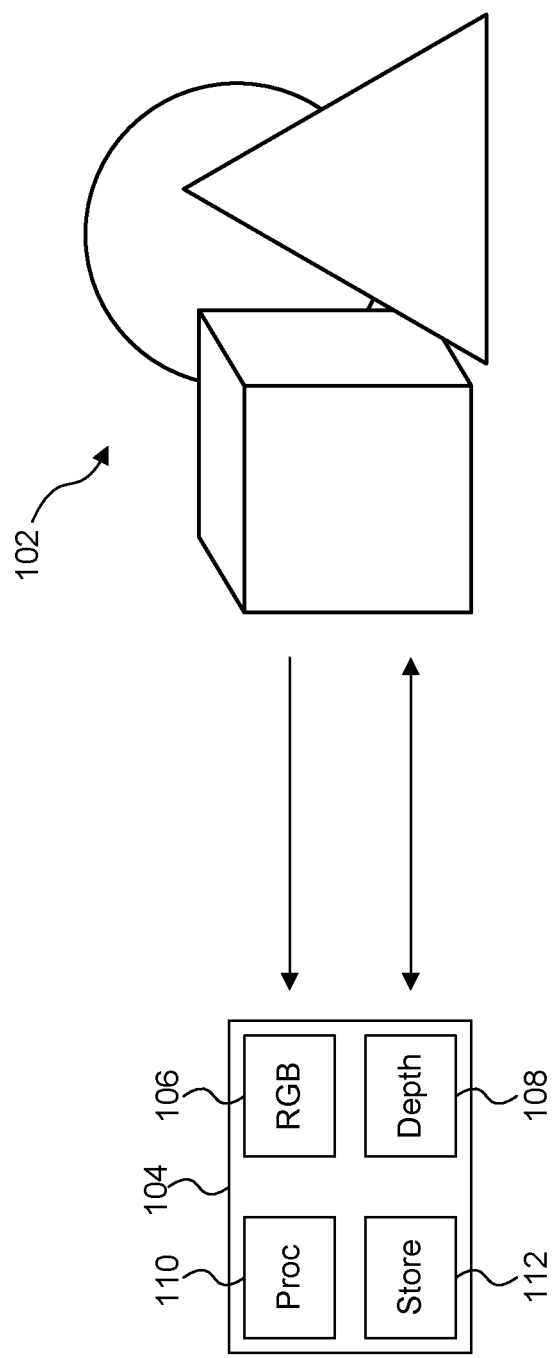
FIG. 1 shows a device capturing images of objects.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only. Embodiments described herein estimate the diffuse albedo and surface normals of the surfaces of objects in a scene. The estimated albedo and surface normals of the objects can be used for many different purposes, for example to facilitate applications such as relighting, scene compositing, stylisation and illumination-independent appearance editing.

Examples described herein involve determining intrinsic colour components and surface normals of objects in input images in a manner which can be implemented in "interactive-time" (or "online"), e.g. as frames of a video sequence are captured. This can be achieved without using vast processing resources due to optimisations used in the methods described herein. This means that examples described herein can be implemented on mobile devices, such as smart phones, tablets, cameras, and laptops, as well as on other devices such as PCs. The performance of the method depends on the implementation, so "real-time" performance could be achieved in some implementations. The appearance of the scene under novel lighting can be reproduced using the albedo and surface normals of objects in the input images together with arbitrary lighting conditions. The capture, intrinsic decomposition and relighting stages can be performed simultaneously as a video processing pipeline operating on multiple frames of a video sequence. By rendering and displaying the images in "interactive-time" a user perceives the displayed images as showing the current state of the objects but with different lighting conditions. For example, some of the examples described herein include estimating full-resolution albedo (i.e. intrinsic colour components), shading, surface normals and lighting of dynamic scenes from RGBD data at near real-time frame rates. RGBD data is a combination of visual data (i.e. RGB data) from one or more input images and depth data (i.e. D) from a depth image.

FIG. 1 shows objects 102 in a scene and a device 104 which is arranged to capture images of the objects 102. The device 104 comprises a camera 106 for capturing input images. The input images comprise image values (e.g. intensity values) representing a visual appearance of the objects 102. In the examples described herein the image values are in an RGB format, but it is to be understood that generally the image values may be in any suitable format, such as YUV. The device also comprises a depth camera 108 for capturing depth images, a processing block 110 arranged to perform image processing, and a store 112 arranged to store data.

Figure 2:
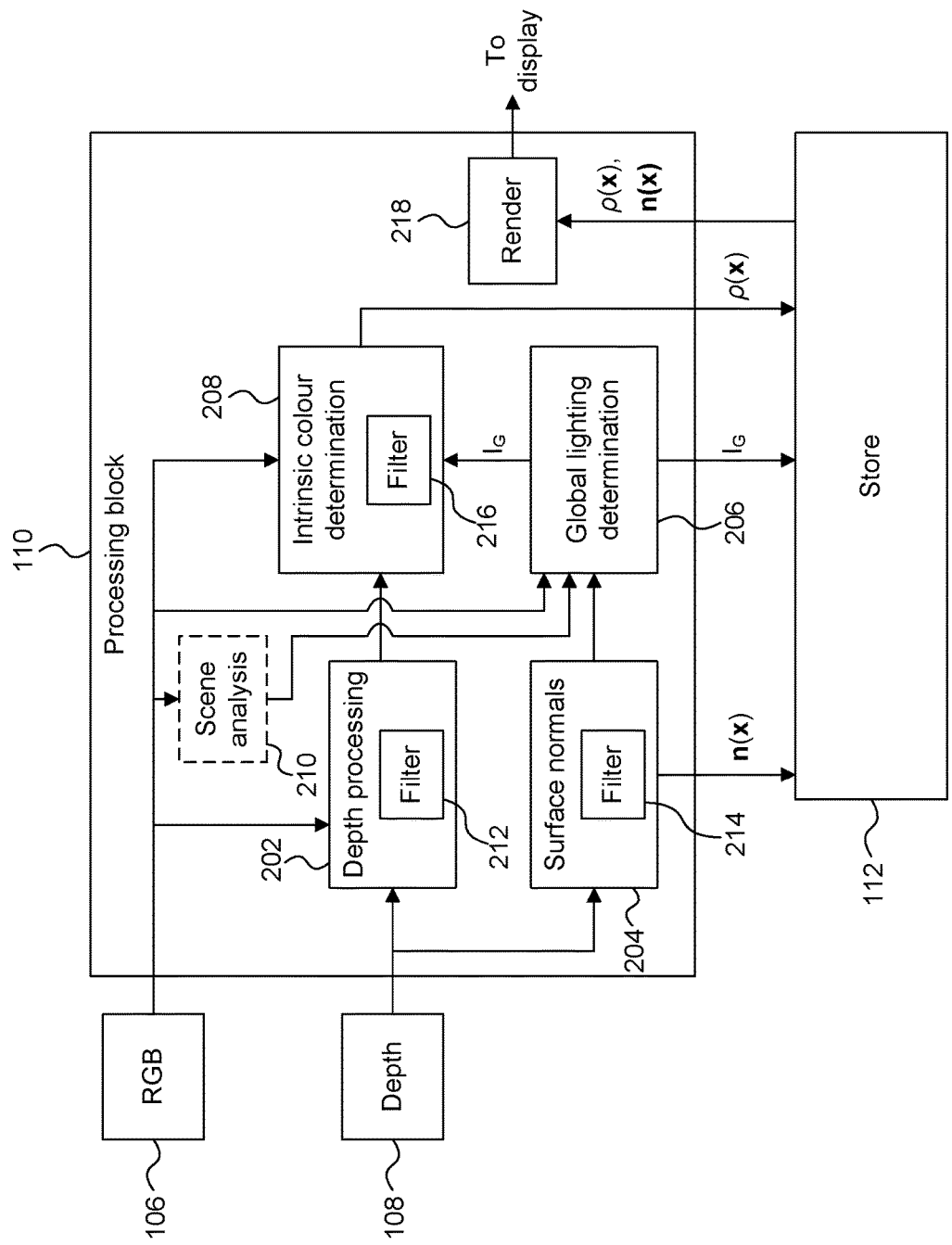
FIG. 2 shows a first image processing system.

FIG. 2 shows components of the processing block 110 in more detail. The components of the processing block 110 may be implemented in hardware, software, firmware, or any combination thereof. The processing block 110 comprises depth processing logic 202, surface normal logic 204, lighting determination logic 206 and intrinsic colour determination logic 208. The depth processing logic 202 comprises a filter 212; the surface normal logic comprises a filter 214; and the intrinsic colour determination logic 208 comprises a filter 216. The processing block 110 may also comprise scene analysis logic 210. The scene analysis logic 210 is shown with a dashed line because in some examples scene analysis logic is not implemented in the processing block. The processing block 110 also comprises render logic 218 configured to render an image including a view of the objects 102 under render lighting conditions.

Figure 3:
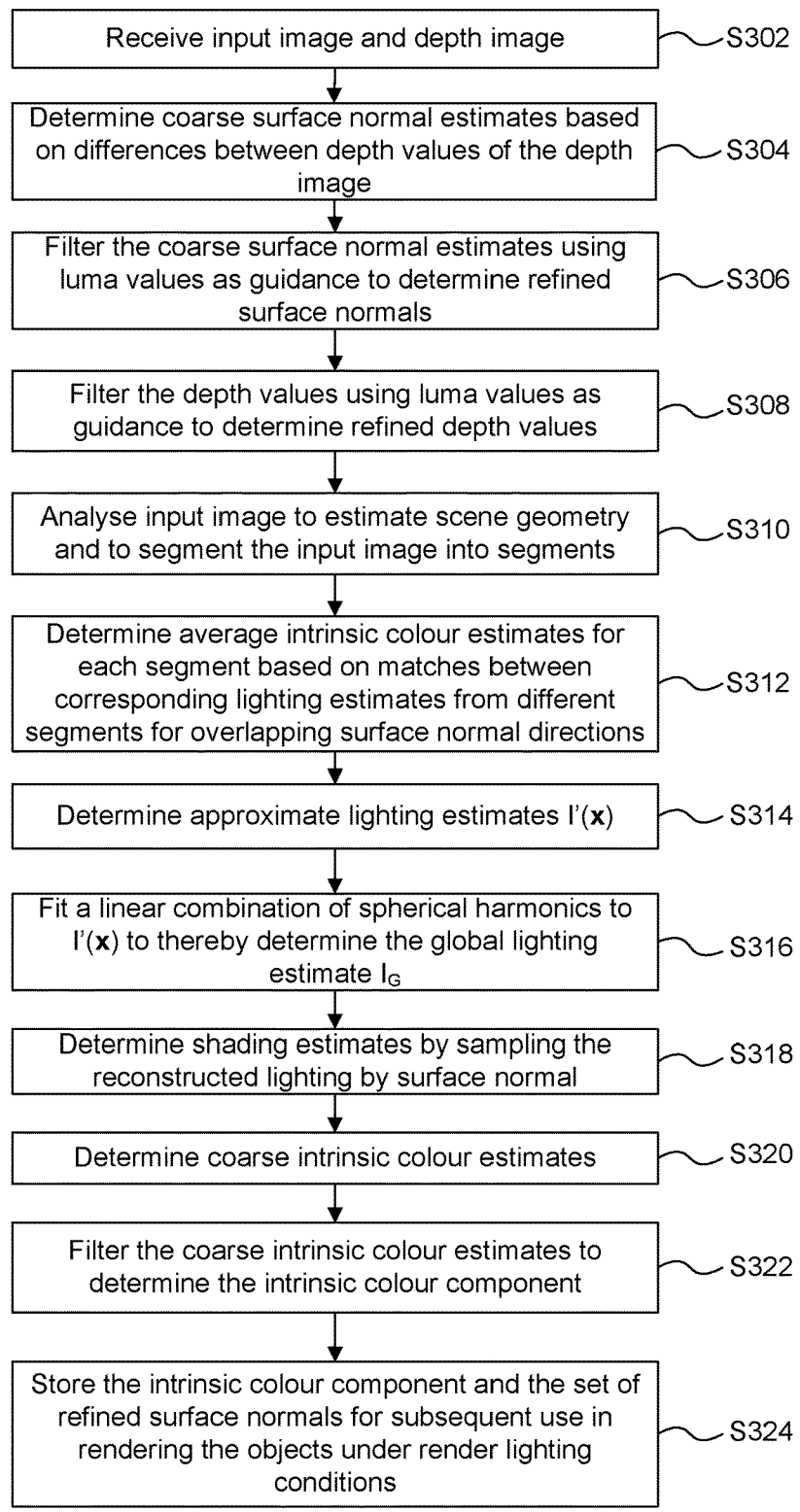
FIG. 3 is a flow chart for a method of determining an intrinsic colour component and surface normals for one or more objects using the first image processing system.

A method of operating the image processing system at the device 104 is described with reference to the flow chart shown in FIG. 3. In step S302 the camera 106 captures an input image representing a view of the objects 102. The input image is passed to, and received by, the processing block 110. Also, in step S302 the depth camera 108 captures a depth image representing depth values of the objects 102. The depth image is passed to, and received by, the processing block 110. Cameras, such as camera 106, for capturing visual images (i.e. visual data representing visible appearance) are well known in the art, and as such the details of how the camera 106 operates are not described herein. Depth cameras, such as depth camera 108, are also well known in the art, and may for example make use of time-of-flight and structured-light depth sensors, and as such the details of how the depth camera 108 operates are not described herein. The "depth" values in the depth image represent distances from the depth camera 108 to surfaces in the scene. The positions of the values of the input image and the depth image approximately match each other, but due to the sensors of the camera 106 being located at a different position to the sensors of the depth camera 108, a parallax effect may cause slight differences in the positions of the values from the input image and the depth image. Furthermore, the depth image (D) may be of lower quality than the input image (T). In particular, depending on the depth camera 108, the depth image (D) may be noisy and have quantisation effects, e.g. due to limited depth resolution, and the depth image may have a mismatched spatial resolution compared with the input image (T), and have object boundary misalignments compared with the input image due to differences in viewpoint or calibration errors. Therefore, as described in more detail below in steps S304 to S308 the depth values and the surface normals (determined from the depth values as described below) are refined (i.e. upsampled and smoothed) to obtain refined depth values and refined surface normals which match the colour image as closely as possible. In other examples, the depth values of the depth image may be determined in other ways (e.g. not using a depth camera). For example, if positions of geometry in the scene are known then the depth values can be determined from the geometry, e.g. by rendering the distance to points of the geometry in the scene using a depth buffer. The input image and the refined depth image are sufficiently aligned with each other to be considered to provide RGBD data, i.e. red, green, blue and depth values for a number of pixel positions of the input image.

The pixel values of the input image, T(x) can be represented as the product of an intrinsic colour value ρ(x) at the pixel position x and the irradiance I(x, n), i.e:

$$T(x)=\rho(x)I(x, n) \tag{1}$$

In a Lambertian scene, shading is equivalent to the irradiance, which is the total incident light energy as a function of pixel position x and surface normal n as shown in equation 2 below. The terms "shading", "irradiance" or "lighting" may be used herein depending on the context, and may be represented as I. The term "lighting" refers to the placement of lights in a scene, and the term "shading" refers to the effect of those lights on the surface of an object.

$$I(x, n)=\int_\Omega R(x, \omega)\max(0, \omega^T n)d\Omega. \tag{2}$$

The integral in equation 2 is performed over the sphere of unit vectors Ω. R(x, ω) is the lighting as a function of surface position x and direction ω. It is noted that x is used herein to represent surface positions, and their projections into the images (i.e. their corresponding image positions). Furthermore, it is noted that x can be used herein to denote both a surface position and a pixel position, where the pixel position x is a projection of the surface position x into screen space. This can be done because there is a one-to-one correspondence between visible points on the surfaces in the scene and their projections into screen space. In other words, given a surface point on an opaque surface, there is no ambiguity about its projection into any cameras that have line-of-sight to it, and no ambiguity between points in images and their projections onto the scene surface. The term max(0, ω$^T$ n) is the clamped cosine kernel. To make the illumination estimation problem tractable in the available time, the lighting is assumed to be position invariant (i.e. the same at all points in the scene) to a first approximation, and it is assumed that the observed inter-reflection and occlusion are negligible. Under these conditions, the irradiance is no longer dependent on surface position x, such that equation 2 simplifies to:

$$I_G(n)=\int_\Omega R(\omega)\max(0, \omega^T n)d\Omega. \tag{3}$$

Since Lambertian scenes are assumed throughout, the global irradiance function $I_G$ is estimated and used for illumination. $I_G$ may be visualised as a lighting function over Ω, which can be sampled by the surface normal. The underlying radiance R(ω) does not have to be estimated, since Lambertian reflectance is assumed and occlusion is neglected. Once $I_G$ is estimated, it can be sampled by surface normal to arrive at a shading image (i.e. a set of shading estimates I(x) at pixel positions x.

The depth values of the depth image are received by the surface normal logic 204. In step S304 the surface normal logic 204 determines coarse surface normal estimates ($n_C$) based on the depth values of the received depth image. In particular, the surface normal estimates ($n_C$) are determined based on differences between depth values of the depth image. For example, the coarse surface normals $n_C$ may be recovered from the depth values of the depth image using a finite differencing approach. For example, a finite difference method can be used to determine a 2D gradient of the surface of the objects 102 at the positions of the depth values of the depth image. The coarse surface normals $n_C$ are perpendicular to the 2D gradients determined from the depth values of the depth image. In particular, the depth image is converted to a 3D point cloud because the surface normals $n_C$ are determined in "world space", and then direction vectors between vertical and horizontal neighbours are found (i.e. finite differencing is applied), and then the surface normals $n_C$ are found as the cross-product of those vectors.

In steps S306 and S308, in order refine the coarse surface normal estimates and the depth values from the depth image, a type of bilateral filtering is used to upsample and smooth the depth and surface normal estimates. Bilateral filtering such as this may be referred to as "cross-bilateral filtering" because it uses luma values derived from the input image T as bilateral guidance terms. In particular, in step S306, the surface normal logic 204 uses the filter 214 to determine a set of refined surface normals by applying bilateral filtering to the coarse surface normal estimates ($n_C$) using bilateral filtering guidance terms based on luma values derived from the input image (T). For example, the surface normal logic 204 may determine refined surface normals n(x) for pixel positions x of the input image T(x), according to the equation 4:

$$n(x) = \frac{1}{u(x)}\int n_C(y)e^{-\frac{\|x-y\|_2^2}{\sigma_d^2}} e^{-\frac{(l(T(x),T(y)))^2}{\sigma_l^2}} dy \tag{4}$$

In equation 4, u is a normalising term so that the filter weights are normalised, and the first exponential term is a standard Gaussian spatial weighting term which varies according to the Euclidean distance between pixel positions x and y, where $\sigma_d$ is variance. The second exponential term in equation 4 represents the bilateral guidance based on the luma values derived from the input image T, where l(T(x), T(y)) represents the difference in luma values between pixel positions x and y of the input image, and $\sigma_l$ is a variance term for a Gaussian distribution of the luma values of the input image T. For example, where the input image T(x) is in an RGB format, then a luma value L(x) at pixel position x may be determined as L(x)=0.299$T_R$(x)+0.587$T_G$(x)+0.114$T_B$(x), where $T_R$(x) represents the Red channel values of the input image at pixel positions x, $T_G$(X) represents the Green channel values of the input image at pixel positions x, and $T_B$(x) represents the Blue channel values of the input image at pixel positions x. In this case:

$$l(T(x),T(y))=0.299(T_R(x)-T_R(y))+0.587(T_G(x)-T_G(y))+0.114(T_B(x)-T_B(y)). \tag{5}$$

As is known in the art, in other examples, a luma value L(x) at pixel position x may be determined differently, e.g. as L(x)=0.2126$T_R$(x)+0.7152$T_G$(x)+0.0722$T_B$(x). In general, any suitable determination of luma values from the values of the input image may be used.

It is noted that the terms "luma" and "luminance" may be used herein to refer to the same property, and as such the terms may be used interchangeably. Although at a detailed technical level it is understood that the terms "luma" and "luminance" do have subtly different meanings, at a higher level (i.e. in a broader sense) they can be understood to refer to the same property. Similarly, the terms "chroma" and "chrominance" may be used herein to refer to the same property, and as such the terms may be used interchangeably. Although at a detailed technical level it is understood that the terms "chroma" and "chrominance" do have subtly different meanings, at a higher level (i.e. in a broader sense) they can be understood to refer to the same property.

The integral of equation 4 may be performed over all of the pixel positions x, or over just a subset of the pixel positions, x. For example, the integral may be performed over a region of ±10 pixel positions in each dimension (e.g. horizontally and vertically) centred on pixel position x.

The bilateral filtering of equation 4 smoothes and upsamples the surface normals but does not blur the surface normals over edges in the input image. That is, there will tend to be large changes in luminance over edges in the input image, such that the value of l(T(x), T(y)) will tend to be high where x and y are on different sides of an edge, so the surface normal n(x) at position x will not be blurred by the values of the coarse surface normal $n_C(y)$ at position y. In this way, similar surface normals are assigned to nearby pixels with similar appearance. Since the bilateral filter 214 uses guidance terms based on the luma values of the input image, the surface normals are refined to be more aligned with edges in the input image. The luma values are used for the bilateral guidance because changes in surface normals tend to be well aligned to changes in the luminance of the input image. That is, there is a strong correlation between surface normal direction and shading, and filtering the coarse surface normals based on the luma values of the input image exploits this correlation. In particular, detailed changes in surface normals tend to be better aligned to the luminance of the input image than to the chroma values of the input image or the depth values of the depth image. This is particularly the case under the assumption of diffuse scene lighting (i.e. non-specular lighting).

The refined surface normals n(x) can be provided to the store 112 for storage therein. The refined surface normals can be used subsequently by the render logic 218 for rendering the objects 102 under render lighting conditions, which may be different to the lighting conditions present in the input image. The refined surface normals are also provided to the global lighting determination logic 206.

In step S308 the depth processing logic 202 uses the filter 212 to derive refined depth values by applying bilateral filtering to the initial depth values of the depth image using bilateral filtering guidance terms based on luma values derived from the input image (T). The initial depth values can be denoted $D_C(x)$ to indicate that they are coarse values, in a similar manner to the coarse surface normals $n_C(x)$ referred to above. For example, the depth processing logic 202 may determine refined depth values D(x) for pixel positions x of the input image T(x), according to the equation 6:

$$D(x) = \frac{1}{u(x)} \int D_C(y) e^{-\frac{\|x-y\|_2^2}{\sigma_d^2}} e^{-\frac{(l(T(x),T(y)))^2}{\sigma_l^2}} dy \quad (6)$$

where u, l(T(x),T(y)), $\sigma_d$ and $\sigma_l$ are defined as described above. Therefore, the first exponential term is a standard Gaussian filtering term which varies according to the distance between pixel positions x and y, and the second exponential term represents the bilateral guidance based on the luma values of derived from the input image T. The bilateral filtering of equation 6 smoothes and upsamples the initial depth values but does not blur the depth values over edges in the input image. Since the bilateral filter 214 uses guidance terms based on the luma values derived from the input image, the depth values are refined to be more aligned with edges in the input image. This helps to correct for any misalignment between the depth image D and the input image T which may occur, e.g. due to parallax resulting from the different physical positions of the camera 106 and the depth camera 108. Therefore, similar depth values are assigned to nearby pixels with similar appearance. In addition to smoothing out the unwanted quantisation artefacts from the initial depth values, the filtering performed by the depth processing logic 202 recovers features which are present in the input image T but which are absent in the depth image D, e.g. due to noise. The refined depth values are provided to the intrinsic colour determination logic 208.

It would be possible to refine the initial depth values $D_C$ to determine the refined depth values D and then to determine the surface normals n from the refined depth values. However, in the example methods described herein the coarse surface normals $n_C$ are determined from the initial depth values $D_C$ and then the surface normals are refined to determine the refined surface normals n. Refining the surface normals and depth values separately in this manner, provides more accurate surface normals because bilateral filters tend to have a certain amount of leakage which causes distortions in depth even across luma edges in the input image. Although these distortions tend to be imperceptible in the refined depth image, they would corrupt surface normals derived from the refined depth image.

In step S310 the scene analysis logic analyses the input image T to estimate scene geometry and to segment the input image into a plurality of regions (or "segments") representing respective materials. Each of the segments represents a respective region of similar appearance in the input image. Methods of segmenting the surfaces of the objects 102 in the input image are known in the art (e.g. see "Efficient Graph-Based Image Segmentation" by Felzenszwalb and Huttenlocher, International Journal of Computer Vision 59, 2, pp. 167-181). As described in more detail below, in some embodiments, the input image is not split into segments, but in the first example described herein, the input image is split into segments.

In step S312 the global lighting determination logic 206 determines, in accordance with the values of the input image T(x) and the determined set of surface normals n(x), a global lighting estimate $I_G(n(x))$ which provides consistent corresponding intrinsic colour estimates for the segments of the objects 102 from the input image T(x). That is, in order to estimate the global lighting estimate $I_G$ a constraint that regions with the same surface normals should have the same lighting is applied. In some examples there may be an additional implicit constraint due to the segmentation: nearby regions with similar appearance should have similar albedos. Where the input image has been segmented, a representative albedo (or "intrinsic colour estimate") is estimated for each segment. The intrinsic colour estimates are chosen to minimise the shading differences between segments with similar surface normals. Most segments will have overlaps with multiple other segments in surface normal space, allowing a solution to global irradiance to be found. The segmentation may be discarded once the irradiance has been found.

In this way, in accordance with the values of the input image T(x) and the determined set of surface normals n(x), representative intrinsic colour estimates $\rho_i$ are determined for each of the regions i, wherein the representative intrinsic colour estimates $\rho_i$ are determined based on matches between corresponding shading estimates from different regions for overlapping surface normal directions. In particular, the representative intrinsic colour estimates $\rho_i$ are determined by choosing representative intrinsic colour estimates that minimise the differences in shading between different regions for overlapping surface normal directions. The global lighting estimate $I_G(n(x))$ can then be determined using the values of the input image T(x) and the determined representative intrinsic colour estimates $\rho_i$ for the regions i.

As an example, the surfaces of the objects 102 are segmented into segments i, forming a set of segments θ. The pixel values of the input image $T_i(x)$ for segment i are related to an approximation of the irradiance $I'_i(\rho_i, n(x))$ for the segment i according to the equation:

$$I'_i(\rho_i, n(x)) = \frac{T_i(x)}{\rho_i} \qquad (7)$$

where $\rho_i$ is an, as yet unknown, representative albedo of segment i. A set of representative albedos ρ (where ρ={$\rho_i$}) are chosen to minimise the difference in irradiance between regions with overlapping surface normals, e.g. according to equation 8:

$$E(\rho)=\Sigma_i\Sigma_{j>i}[\int_\Omega[I'_i(\rho_i, \omega)-I'_j(\rho_j, \omega)]Q_{i,j}(\omega)d\Omega]^2 \qquad (8)$$

where $Q_{i,j}$ is a binary support function representing the overlap in surface normal direction between segments i and j, such that $Q_{i,j}=\{n_i\} \cap \{n_j\}$. The optimum set of representative albedos ρ* is chosen to minimise E(ρ), such that ρ*=argmin$_\rho$E(ρ) subject to max(ρ)=1.

One way of determining the optimum set of representative albedos ρ* is to determine the null vector of the matrix G, where:

$$G = \begin{pmatrix} \sum_{i\neq 1} g_{1i}^2 & -g_{12}g_{21} & \cdots & -g_{1n}g_{n1} \\ -g_{21}g_{12} & \sum_{i\neq 2} g_{2i}^2 & \cdots & -g_{2n}g_{n2} \\ \vdots & \vdots & \ddots & \vdots \\ -g_{n1}g_{1n} & -g_{n2}g_{2n} & \cdots & \sum_{i\neq n} g_{ni}^2 \end{pmatrix} \qquad (9)$$

where $$g_{ij} = \int_\Omega T_i(\omega)Q_{i,j}\,d\Omega \qquad (10)$$

where $T_i(n(x))=T_i(x)$ is the projection of $T_i$ into Ω by surface normal.

In step S314 the global lighting determination logic 206 determines approximate shading estimates I'(x) by dividing the values of the input image T(x) by the representative intrinsic colour estimate $\rho_i$* for the segment i at surface position x, as shown in FIG. 11:

$$I'(x) = U_{i\in\Theta}\frac{T_i(x)}{\rho_i^*} \qquad (11)$$

These approximate shading estimates I'(x) indicate approximate shading estimates at the surface positions x on the surfaces of the objects 102. These approximate shading estimates I'(x) can be used with knowledge of the surface normals n(x) at the surface positions x to determine a global lighting estimate $I_G(\omega)$ as a function of direction ω.

In particular, in step S316 the global lighting determination logic 206 fits a linear combination of spherical harmonic components $Y_m^l$ to the approximate shading estimate I' to thereby determine the global lighting estimate $I_G$, where m is the spherical harmonic degree and l the spherical harmonic order. In the examples described herein the linear combination of spherical harmonic components includes spherical harmonic components up to the second order, because this gives a good approximation to the true global irradiance without being too computationally complex to be performed on low-cost processors (e.g. which may be implemented in mobile devices such as smart phones, tablets and cameras) as discussed in a paper by Ramamoorthi, R., and Hanrahan, P. 2001, "On the relationship between radiance and irradiance: determining the illumination from images of a convex Lambertian object", Journal of the Optical Society of America A 18, 10, 2448. Using spherical harmonic components up to the $2^{nd}$ order is sufficient under an assumption that the lighting varies spatially with low frequency. However, in other examples more or fewer spherical harmonic components may be included.

The global lighting estimate $I_G$ can therefore be represented as:

$$I_G=\Sigma_{m=0}^{2}\Sigma_{l=0}^{m} k_m^l Y_m^l \qquad (12)$$

where $\{k_m^l\}$ is a set of complex coefficients to be determined, and $\{Y_m^l\}$ are complex spherical harmonic functions over the sphere. There are nine degrees of freedom in the lighting model. A harmonic image method is used to determine the coefficients $\{k_m^l\}$. $\{Y_m^l\}$ are functions of direction, but it is useful to have these complex functions represented in the surface co-ordinates x. Therefore harmonic images $Q_m^l(x)$ are defined as:

$$Q_m^l(x)=Y_m^l(n(x)) \qquad (13)$$

We can then define $Q \in C^{p\times H}$ to be a matrix of vectorised harmonic images, where p is the number of pixels in the input image, and H is the number of harmonic images (H=6 in this example). $\mathcal{J}$ is defined as a vectorised version of the approximate shading estimates I'(x). Then the global lighting determination logic 206 determines a set of coefficients k (where k={$k_m^l$}) which gives the best fit to the approximate shading estimates I'(x), e.g. in a least squares sense, according to the equations:

$$\operatorname{argmin}_k \|Qk - \mathcal{J}\|_2^2 \qquad (14)$$

$$k^* = (Q^TQ)^{-1}Q^T\mathcal{J}$$

where k* represents the set of coefficients $\{k_m^l\}$ which gives the best fit. Substituting these coefficients back into equation 12 gives the global lighting estimate $I_G(\omega)$ as a function of direction ω. The global lighting estimate $I_G(\omega)$ is provided to the intrinsic colour determination logic 208. The global lighting estimate $I_G(\omega)$ is also provided to the store 112 for storage therein. As described in more detail below, the global lighting determination logic 206 may retrieve the global lighting estimate for previous frames from the store 112 to guide the estimated global lighting estimate for a given frame of the video sequence.

In step S318 the intrinsic colour determination logic 208 determines shading estimates $I_S(x)$ using the determined global lighting estimate $I_G(\omega)$ and the determined surface normals n(x), such that:

$$I_S(x)=I_G(n(x)), \qquad (15)$$

where x represents a surface position on the one or more objects. In other words, the shading estimates $I_S(x)$ are determined by sampling the reconstructed lighting $I_G(\omega)$ by surface normal n(x).

In previous methods, shading estimates can become ill-conditioned, and sensitive to background noise in very dark regions of the input image. This is a general problem in intrinsic image estimation, and previous methods tend to either avoid images with very dark regions or introduce additional regularisation. However, in the methods described herein, the availability of surface normals means that a shading estimate can still be found, even in dark regions. Furthermore, segments mainly comprised of dark pixels can be detected and removed prior to albedo balancing. Segments may also be discarded due to incomplete surface normal data. The shading reconstruction is then performed on a reliable subset of the segments θ. The harmonic images only contain data for pixels in the input image that contribute to the approximate shading estimates I'. The shading image $I_S$ is produced by sampling the global illumination $I_G$ by surface normal. This gives a shading estimate for all pixels for which surface normal data is available, including dark regions.

The intrinsic colour component of the objects 102 can be determined using the values of the input image and the determined shading estimates $I_S(x)$. In step S320 the intrinsic colour determination logic 208 determines coarse intrinsic colour estimates $\rho_c(x)$ such that $$\rho_c(x) = \frac{T(x)}{I_S(x)}.$$

As described above, the shading estimate $I_S$ is determined based on the surface normals of the objects 102. However, there may be high frequency shading effects that cannot be modelled with the surface normals and the global lighting estimate. For example, high-frequency geometry below the resolution of the depth image may not appear in the surface normal image, so the remaining shading may be extracted by other means, as described below.

In step S322 the intrinsic colour determination logic 208 refines the coarse intrinsic colour estimates to determine the intrinsic colour component $\rho(x)$ for the image. This is done by applying bilateral filtering to the coarse intrinsic colour estimates using bilateral filtering guidance terms based on: (i) luminance values derived from the input image, (ii) chrominance values derived from the input image, and (iii) the refined depth values derived from the received depth image. As described above, the depth values are refined by the depth processing logic 202 by applying bilateral filtering to the depth values of the depth image using bilateral filtering guidance terms based on the luma values derived from the one or more input images. The refined depth values are provided to the intrinsic colour determination logic 208.

In particular, the intrinsic colour (or "albedo") refinement is based on the local neighbourhood B(x) surrounding a pixel position x. The local neighbourhood B(x) may for example include a block of pixel positions extending in two dimensions by ±10 pixel positions centred on position x, but in other examples, the neighbourhood may be a different shape and/or size.

The intrinsic colour component $\rho(x)$ can be determined by finding the values of $\rho(x)$ which minimise the cost function:

$$E(\rho, I) = \sum_x \left(\rho(x) - \sum_{y \in B(x)} w(x,y)\rho(y)\right)^2 + \sum_x \left(\frac{T(x)}{I(x)} - \rho(x)\right)^2 \qquad (16)$$

where w(x, y) is a distance function given by:

$$w(x, y) = e^{-\frac{(\theta(T(x),T(y)))^2}{\sigma_\theta^2}} e^{-\frac{(l(T(x),T(y)))^2}{\sigma_l^2}} \qquad (17)$$

where the first exponential term in equation 17 provides an indication of the chroma difference between pixels T(x) and T(y) of the input image, and the second exponential term in equation 17 provides an indication of the luma difference between pixels T(x) and T(y) of the input image. In particular, l(T(x), T(y)) is defined in the same way as described above, e.g. as shown in equation 5 as an example. The θ(T(x), T(y)) term represents the angle between vectors in RGB colour space of the colour values of the input image at positions x and y, and may for example be defined as:

$$\theta(T(x), T(y)) = \cos^{-1}(\hat{T}(x)^T \hat{T}(y)), \qquad (18)$$

and $\sigma_\theta$ is the variance of the colour angle term. $\hat{T}(x)$ is the chrominance at position x represented using a normalised vector in RGB space. The colour angle θ is a measure of chrominance difference.

The variances of the luma and colour-angle terms ($\sigma_l$ and $\sigma_\theta$) may be adapted to the local neighbourhood. The first summation term of equation 16 "flattens out" regions of similar albedo, whereas the second summation term avoids the trivial result $\rho(x)=0$ for all x. The same result is achieved by minimising the first term only, and updating I as $$I = \frac{T}{\rho}.$$

This can be achieved by iterative application of a bilateral filter (as shown in equation 19 for the $t^{th}$ iteration), modified to incorporate the colour similarity term of equation 18.

$$\rho_{t+1}(x) = \frac{1}{u(x)} \int \rho_t(y) e^{-\frac{\|x-y\|_2^2}{\sigma_d^2}} e^{-\frac{(l(T(x),T(y)))^2}{\sigma_l^2}} e^{-\frac{(\theta(T(x),T(y)))^2}{\sigma_\theta^2}} dy \qquad (19)$$

A further improvement to the filtering can be achieved using the refined depth values derived from the depth image. Since discontinuities in depth correspond to occlusion boundaries, they are likely to coincide with discontinuities in albedo. Therefore the availability of a depth channel can be exploited by adding a depth guidance term as shown in equation 20:

$$\rho_{t+1}(x) = \qquad (20)$$
$$\frac{1}{u(x)} \int \rho_t(y) e^{-\frac{\|x-y\|_2^2}{\sigma_d^2}} e^{-\frac{(l(T(x),T(y)))^2}{\sigma_l^2}} e^{-\frac{(\theta(T(x),T(y)))^2}{\sigma_\theta^2}} e^{-\frac{\|D(x)-D(y)\|_2^2}{\sigma_D^2}} dy$$

where D(x) and D(y) are the refined depth values provided by the depth processing logic 202 at positions x and y, and $\sigma_D$ is the variance of the refined depth values.

The use of the depth values as bilateral guidance terms to refine the intrinsic colour estimates provides better intrinsic colour estimates in the sense that intrinsic colour is not blurred over boundaries in the depth image. This is beneficial because boundaries in the depth image tend to indicate boundaries between different objects in the image, and blending the intrinsic colour estimates over these boundaries may result in artefacts in the intrinsic colour estimates. Using the depth values as bilateral guidance terms reduces these artefacts.

The results of the bilateral filtering according to equation 20 are used as the final intrinsic colour component ρ of the objects 102, which is sent to the store 112 in step S324 for storage therein, to be used for rendering the objects 102 under render lighting conditions, which may be different to the lighting conditions present in the input image. The final irradiance estimates $I_f$ can be found according to $$I_f(x) = \frac{T(x)}{\rho(x)}.$$

The final irradiance estimates may, or may not, be stored in the store 112 since they are not needed for rendering the scene under different lighting conditions, but they may be useful for other purposes. As described above, the surface normals determined in step S306 are stored in the store 112, and this may be done at the same time as storing the intrinsic colour component in the store 112 in step S324, or it may be done at another time, e.g. at the time of determining the surface normals.

The first iteration of the filter represented by equation 20 takes the coarse intrinsic colour estimates as the input, i.e. $\rho_0(x)=\rho_C(x)$. The filter can be applied for one or more iterations to determine the final intrinsic colour component. Although a marginal improvement is possible by performing multiple iterations, the intrinsic colour estimates converge rapidly, and a single iteration tends to be sufficient unless a high level of accuracy is desired. The number of iterations performed is implementation specific, and may be adapted depending on the quality desired for a particular use of the system.

The filter in equation 20 is sensitive to noise in dark regions of the input image. Although plausible intrinsic colour components ρ result in these cases, the noise will be amplified in the final lighting estimates $I_f$. In the worst case, the lighting is undefined where ρ is estimated to be zero. For this reason, dark regions are biased towards the coarse shading estimate $I_S$ to determine a refined final lighting estimate $I'_f(x)$ using a weighted sum such that:

$$i\ I'_f(x)=\alpha I_S(x)+(1-\alpha)I_f(x) \quad (21)$$

where α is a coefficient which sets the weight in the sum and takes a value:

$$\alpha = e^{-\frac{\min[T(x)]^2}{\gamma}} \quad (22)$$

The value of the cut-off parameter γ can be determined experimentally.

The render logic 218 is used to render a view of the objects under render lighting conditions using the surface normals n(x) and the intrinsic colour components ρ(x), as is known in the art. A lighting function $I_r(\omega)$ defines the render lighting conditions as a function of direction ω and is provided to the render logic 218. In particular, the surface normals n(x) are used in combination with the lighting function $I_r(\omega)$ to determine shading estimates $I_S(x)$ for the surface positions x of the objects 102 according to $I_S(x)=I_r(n(x))$. Then image values $T_r(x)$ of the rendered image on the surfaces of the objects can be determined according to $T_r(x)=I_S(x)\rho(x)$. These image values $T_r(x)$ are pixel values representing the objects 102 in the rendered image under the render lighting conditions. The rendered image can be provided to a display, e.g. for display in real-time.

In the examples described above, the scene analysis logic 210 splits the surfaces of the objects 102 into regions which are spatially contiguous segments of the objects. In other examples, the scene analysis logic 210 might not be implemented in the processing block 110. In the examples described below with reference to FIGS. 4 to 6, the regions are not necessarily spatially contiguous and are determined by identifying pixels of the input image with albedo differences below a threshold.

Figure 4:
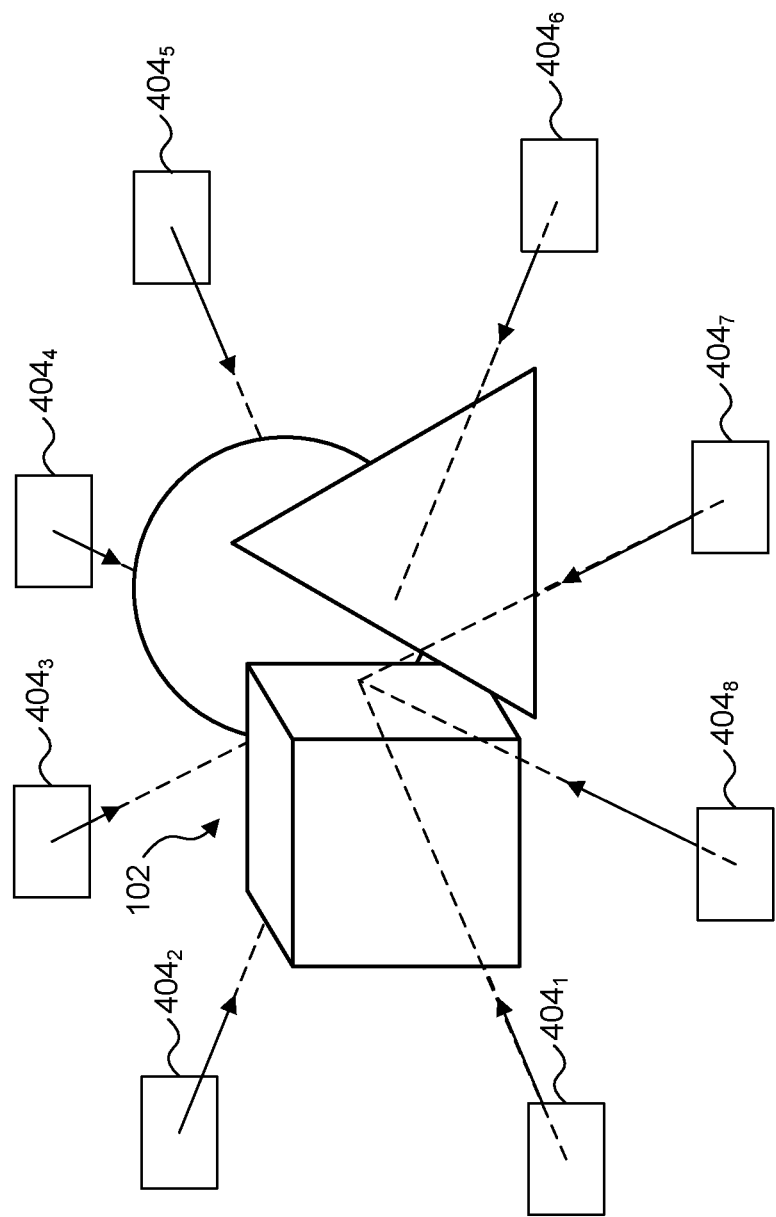
FIG. 4 shows an arrangement of cameras capturing images of objects.
Figure 5:
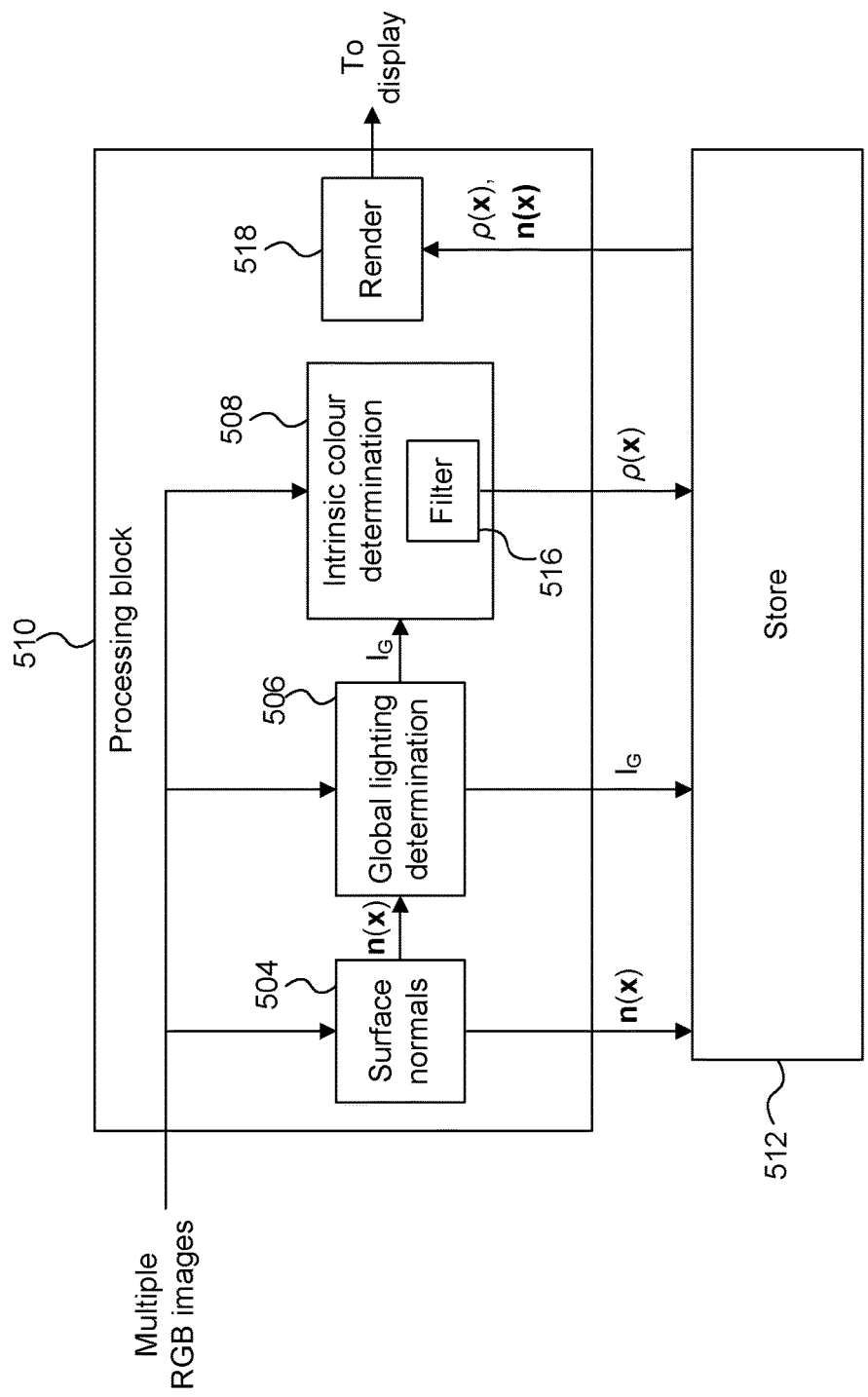
FIG. 5 shows a second image processing system.
Figure 6:
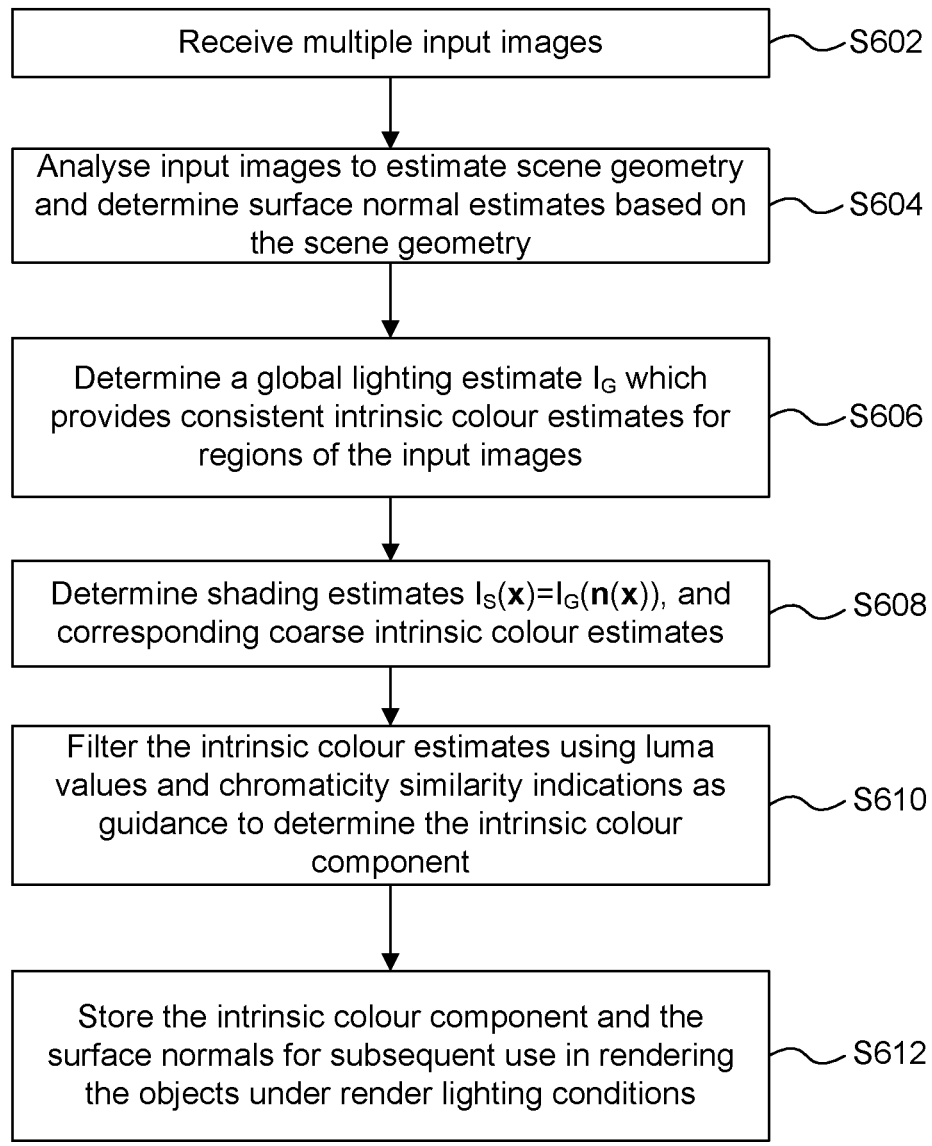
FIG. 6 is a flow chart for a method of determining an intrinsic colour component and surface normals for one or more objects using the second image processing system.

FIG. 4 shows an example in which multiple views of the objects 102 from respective viewpoints are captured using multiple cameras ($404_1$ to $404_8$). In the example shown in FIG. 4 there are eight cameras, but in other examples there may be a different number of cameras capturing views of the objects 102. The cameras 404 may be implemented in separate devices but may be arranged to provide the images that they capture to a processing system which can process the multiple images together. The processing system may be implemented in the same device as one or more of the cameras 404, or may be implemented in a separate device to all of the cameras 404. The processing system is shown in FIG. 5.

The processing system comprises a processing block 510 and a store 512. The processing block 510 comprises surface normal logic 504, global lighting determination logic 506 and intrinsic colour determination logic 508. The intrinsic colour determination logic 508 comprises a filter 516. The processing block 510 also comprises render logic 518. A method of using the system shown in FIG. 5 is described with reference to the flow chart shown in FIG. 6.

In step S602 multiple input images are received at the processing block 510 from the cameras 404. The multiple input images are provided to the surface normal logic 504, to the global lighting determination logic 506 and to the intrinsic colour determination logic 508. A depth camera is not used in the example described with reference to FIGS. 4 to 6, but in other examples, one or more depth cameras could be used in combination with multiple cameras 404. Rather than determining surface normals using a depth image, in the example shown in FIG. 5, a multi-view reconstruction of the surfaces of the objects comprising the scene, hereinafter the "scene geometry" of the objects 102 (based on the multiple input images) is used to determine the surface normals.

In step S604 the surface normal logic 504 analyses the input images to estimate scene geometry and determine the surface normal estimates of the objects 102 based on the scene geometry. Methods of analysing multiple input images of a scene from different viewpoints to determine scene geometry are known in the art (for example see the paper by Furukawa and Ponce entitled "Accurate, Dense, and Robust Multi-View Stereopsis", Pattern Analysis and Machine Intelligence, IEEE Transactions on (Volume:32 , Issue: 8)), and as such are not described in detail herein. The surface normals determined by the surface normal logic 504 are provided to the global lighting determination logic 506 and are sent to the store 512 for storage therein for use in rendering the objects under render lighting conditions.

The input cameras 404 produce a set of input images $\{T_c\}_{c \in C}$ where C represents the set of input images. The c subscript will be dropped herein where single images are being processed. Each input image T has a corresponding chroma image K, for which each pixel is normalised in RGB space:

$$K(x) = \frac{T(x)}{\|T(x)\|_2}. \quad (23)$$

In step S606 the global lighting determination logic 506 determines a global lighting estimate $I_G$ which provides consistent intrinsic colour estimates for regions of the input images. This is achieved differently compared to in the examples described above with references to FIGS. 1 to 3. Although the input images could be segmented into segments, in this example, rather than segmenting the surfaces of the objects 102 into a plurality of spatially contiguous segments, an albedo similarity function $\Gamma$ is used to identify pixels in a local neighbourhood which are likely to have similar albedo. These identified pixels can be considered as a region in a local neighbourhood defined by $\Gamma$. These regions are not necessarily spatially contiguous. This is based on an observation that nearby pixels with similar chroma or luma values are highly likely to share similar albedo. It is noted that the region identified by $\Gamma$ changes with surface position, and so is not a segmentation in the usual sense of the term. As an example, the albedo similarity function may be defined as:

$$\Gamma(x, y) = \begin{cases} 1, & \text{if } \|K(x) - K(y)\|_2^2 < \kappa \\ 0, & \text{otherwise} \end{cases} \quad (24)$$

where $\kappa$ is a chromaticity threshold which may be fixed or variable, e.g. $\kappa$ may be a function that adapts to the local neighbourhood. The global lighting determination logic 506 determines the regions by identifying pixels with chromaticity differences below the chromaticity threshold $\kappa$. In other examples, the albedo similarity function $\Gamma$ may be determined in a different manner. For example, the albedo similarity function $\Gamma$ includes indications that may identify a probability that a first pixel (x) and a second pixel (y) are part of the same region, where the albedo similarity indications may be determined based on at least one of: (i) differences in luma values for the first and second pixels, and (ii) differences in chroma values for the first and second pixels. For example, the albedo similarity function $\Gamma$ may be determined according to equation 24a:

$$\Gamma(x, y) = \log[P(\rho; |L(x) - L(y)|)] + \log[P(\rho; |K(x) - K(y)|_2)] \, y \in N(x), \quad (24a)$$

where $P(\rho; b)$ is the probability, given b, of two pixels at positions x and y having the same albedo, L is luma, K is chroma, and N(x) is the local neighbourhood of x.

As described above, the global lighting estimate $I_G(n(x), k)$ as a function of direction is defined in equation 12 as a sum of spherical harmonic components $\{Y_m^l\}$ up to the second order, where $\{k_m^l\}$ is a set of complex coefficients to be determined. Furthermore, the global lighting function can be mapped to initial shading estimates $I_S(x, k)$ for each input image for surface positions x on the objects 102 using the surface normals, such that $I_S(x, k) = I_G(n(x), k) =$, where k represents the set of spherical harmonic coefficients $\{k_m^l\}$. The shading estimates $I_S(x, k)$ relate to corresponding initial intrinsic colour estimates $\rho_S(x, k)$ according to $T(x) = I_S(x, k)\rho_S(x, k)$. A cost function $\Phi(k)$ can be used to find the best fit for the set of coefficients k with the aim of reducing differences in intrinsic colour components for regions defined by the albedo cost function $\Gamma$. It is noted that nearby pixels with similar chroma and luma are likely to share the same albedo, and albedo is likely to be piecewise flat within a small local region. The shading can therefore be chosen to minimise the differences between nearby pixels with similar chroma, luma or a combination of both. In this way the set of coefficients k is determined on the basis that pixels from the same region (i.e. representing the same material) are likely to have similar intrinsic colour components. The cost function $\Phi(k)$ is given by:

$$\Phi(k) = \Sigma_C \Sigma_{x \in X} \Sigma_{y \in N(x)} \Gamma(x, y) \|\rho_S(x, k) - \rho_S(y, k)\|_2. \quad (25)$$

Each colour channel is optimised separately by minimising this cost function. To avoid the trivial solution k=0, the "DC" element for each colour channel is set to 1. In accordance with equation 25, the set of coefficients k which minimise the cost function $\Phi(k)$ are determined based on differences between intrinsic colour estimates for the regions. Minimising the cost function $\Phi(k)$ can be considered to be choosing the shading to maximise the similarity of intrinsic colour estimates in local regions. The determined coefficients k define the global lighting estimate $I_G$ according to equation 12. In equation 25, N(x) is a local neighbourhood of the surface position x, and for example may be an 11×11 window centred on the position x.

The global lighting estimate $I_G$ is provided to the intrinsic colour determination logic 508. In step S608 the intrinsic colour determination logic 508 uses the global lighting estimate $I_G$ to determine shading estimates $I_S(x)$ at the surface positions x, as described above such that $I_S(x) = I_G(n(x))$. In step S608 the intrinsic colour determination logic 508 also determines corresponding coarse intrinsic colour estimates $(\rho_S(x))$ according to $$\rho_S(x) = \frac{T(x)}{I_S(x)}.$$

The coarse intrinsic colour estimates $\rho_S(x)$ determined in step S608 may retain high-frequency shading detail that cannot be modelled using the coarse scene reconstruction, as well as inter-reflection and/or cast shadows. So in step S610 the intrinsic colour determination logic 508 uses the filter 516 to apply bilateral filtering to the coarse intrinsic colour estimates using bilateral guidance terms based on chroma and luma values derived from the input image and using albedo similarity indications ($\Gamma$) which identify whether pixels are part of the same region.

A simple filter for smoothing out regions of similar chroma, thus enforcing the piecewise-constant albedo assumption could be used, such that:

$$\rho_f(x) = \frac{1}{u} \int_X \rho_S(y) \Gamma(x, y) e^{-\frac{\|x-y\|_2^2}{\sigma_d^2}} dy \quad (26)$$

where $\rho_f(x)$ are the filtered intrinsic colour estimates, u is a normalisation factor, and X represents all of the surface positions x of the surfaces of the objects.

Furthermore, inter-reflection poses a particular challenge for chroma-based intrinsic image methods, since it shifts the chroma of pixels so that regions with similar albedo no longer necessarily share similar chroma. For example, if a surface is of uniform albedo r, after the $n^{th}$ bounce an incoming white ray of light will have colour $r''$, which has the effect of saturating the chroma. In practice, this means that regions with high inter-reflectance are isolated from the rest of the scene by the chroma term in the simple filter represented by equation 26, making cast shadow removal difficult using the method in equation 26. To address this problem, the albedo similarity term $\Gamma(x, y)$ can be relaxed in regions with high likelihood of inter-reflection and cast shadows. Ambient occlusion is strongly correlated with cast shadows and inter-reflection, since all three are caused by concave scene geometry. An estimate of ambient occlusion is therefore a useful indicator of inter-reflection and cast shadows. Therefore, the filter may include indications of likelihood of inter-reflection or cast shadows at particular positions x, where those indications may incorporate an estimate of ambient occlusion.

Therefore the intrinsic colour determination logic 508 determines the ambient occlusion of the scene. The scene geometry is rendered under white directional lighting from a large number (e.g. 512) of random directions. These renders are summed to produce a normalised ambient occlusion estimate, $A(x)$. When filtering across large discontinuities in ambient occlusion A, the luma term is also disabled to allow for filtering across the boundary. Both this and the adaptive chromaticity threshold $\kappa$ are shown in equation 27.

$$\rho_f(x) = \frac{1}{u} \int_X \rho_S(y) \Gamma_{AO}(x, y, A(x) - A(y)) e^{-\frac{\|x-y\|_2^2}{\sigma_d^2}} dy \quad (27)$$

where $$\Gamma_{AO}(x, y, a) = \begin{cases} (1 + \gamma^2)\Gamma(x, y), & \text{if } a \leq 0 \\ \Gamma(x, y), & \text{otherwise} \end{cases} \quad (28)$$

The experimentally-determined parameter $\gamma$ relaxes the albedo similarity $\Gamma$ if the pixel x is more occluded than pixel y. The different cases for positive and negative a ensure that this is a one-way relaxation, which results in occluded pixels assuming the appearance of their unoccluded neighbours, whereas unoccluded pixels remain unaffected by occluded neighbours.

In the case of multiple input views, cross-image constraints can be introduced to ensure a consistent intrinsic colour estimate across all images. In this way, the intrinsic colour determination logic 208 can be configured to determine said intrinsic colour component to be consistent across the multiple views. For example, this can be achieved by iterative application of the filter in equation 29, initialised with $\rho_0 = \rho_S$.

$$\rho_{n+1}(x) = \frac{1}{u} \sum_{c \in C} \left[ \beta(c, x) \int_X \rho_n^c(y) \Gamma_{AO}(x, y, A(x) - A(y)) e^{-\frac{\|x-y\|_2^2}{\sigma_d^2}} dy \right] \quad (29)$$

$\beta$ is a blending function, which weights the contribution of each albedo image $\rho_n^c$ from a set of C input views depending on directness of view and line-of-sight to the point x.

The filtered intrinsic colour estimates $\rho_f(x)$ are used as the intrinsic colour component for the objects 102. In step S612 the intrinsic colour component is sent from the intrinsic colour determination logic 508 to the store 512 for storage therein. The surface normals are sent from the surface normal logic 504 to the store 512 for storage therein.

Furthermore, the global lighting estimate $I_G$ may be sent from the global lighting determination logic 506 to the store 512 for storage therein. The intrinsic colour component and the surface normals may be subsequently used, e.g. by the render logic 518, to render an image of the objects 102 under render lighting conditions, as is described above in relation to the render logic 218.

The methods described above relate to determining intrinsic colour components and surface normals for a scene at a single time instance, even though in some cases multiple views of the scene are used. The methods can be extended to determining intrinsic colour components and surface normals for multiple frames of a video sequence. When performing intrinsic video estimation, a constraint that the albedo is consistent across frames of the sequence can be enforced to ensure a temporally coherent decomposition into albedo and shading. In some previous methods point correspondences are used to constrain albedo across a sequence of frames. In those previous methods, dynamic scenes would require point tracking for example using an optical flow technique, which is computationally complex and slow to run on current hardware on most low-cost mobile devices such as smart phones, tablets and cameras.

Temporal consistency in albedo and shading is achieved by introducing a temporal prior on lighting: consecutive frames are expected to have similar lighting. In methods described herein, scene lighting $I_G$ is estimated for frames of a video sequence, as opposed to directly estimating shading for the frames. It is simple to constrain the scene lighting to be consistent across multiple frames of a video sequence. Then, when a consistent lighting estimate $I_G$ has been determined for a frame, the image data for the frame can be decomposed into intrinsic colour and shading as described above. For sufficiently high frame rates (e.g. above 2 Hz), lighting estimates do not need to be determined on every frame, but rather on lighting keyframes of the sequence of frames, which can provide an important performance optimisation. There is a tradeoff between number of lighting keyframes (generally the fewer, the better), lighting stability and adaptability.

Figure 7:
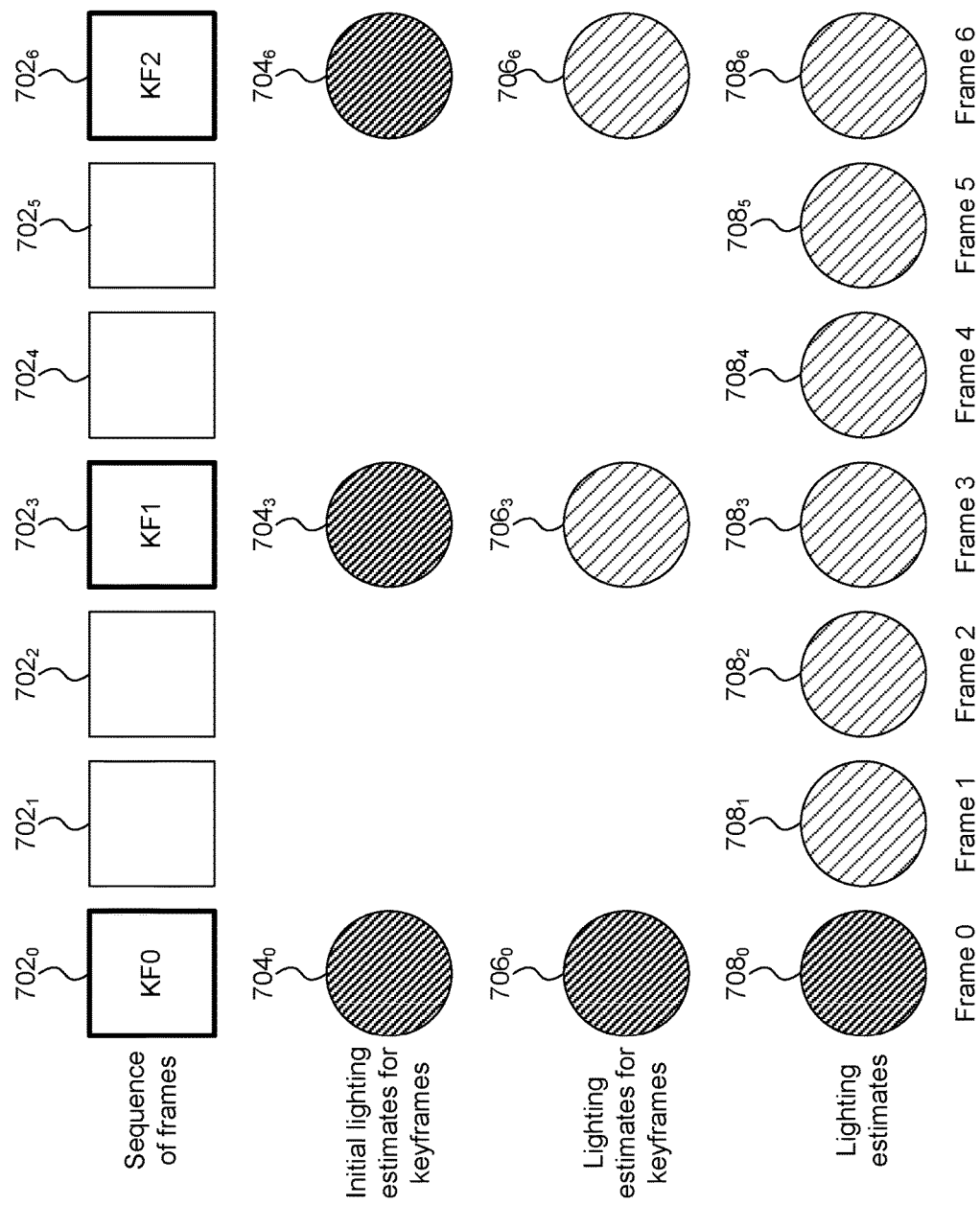
FIG. 7 illustrates processing of lighting estimates for a sequence of frames.

FIG. 7 shows an example representing seven frames of a video sequence (702$_0$ to 702$_6$), wherein one in three of the frames is designated as a lighting keyframe.

For example, the frames 702$_0$, 702$_3$ and 702$_6$ are lighting keyframes in this example, which may be referred to as lighting keyframes A, B and C. For each frame of the video sequence, one or more input images are received and a depth image may be received, as described above, in order to determine lighting estimates $I_G$ for the frames of the video sequence. That is, for each frame of the sequence, one or more input images are received representing one or more views of the objects 102 at a time instance corresponding to that frame.

Figure 8:
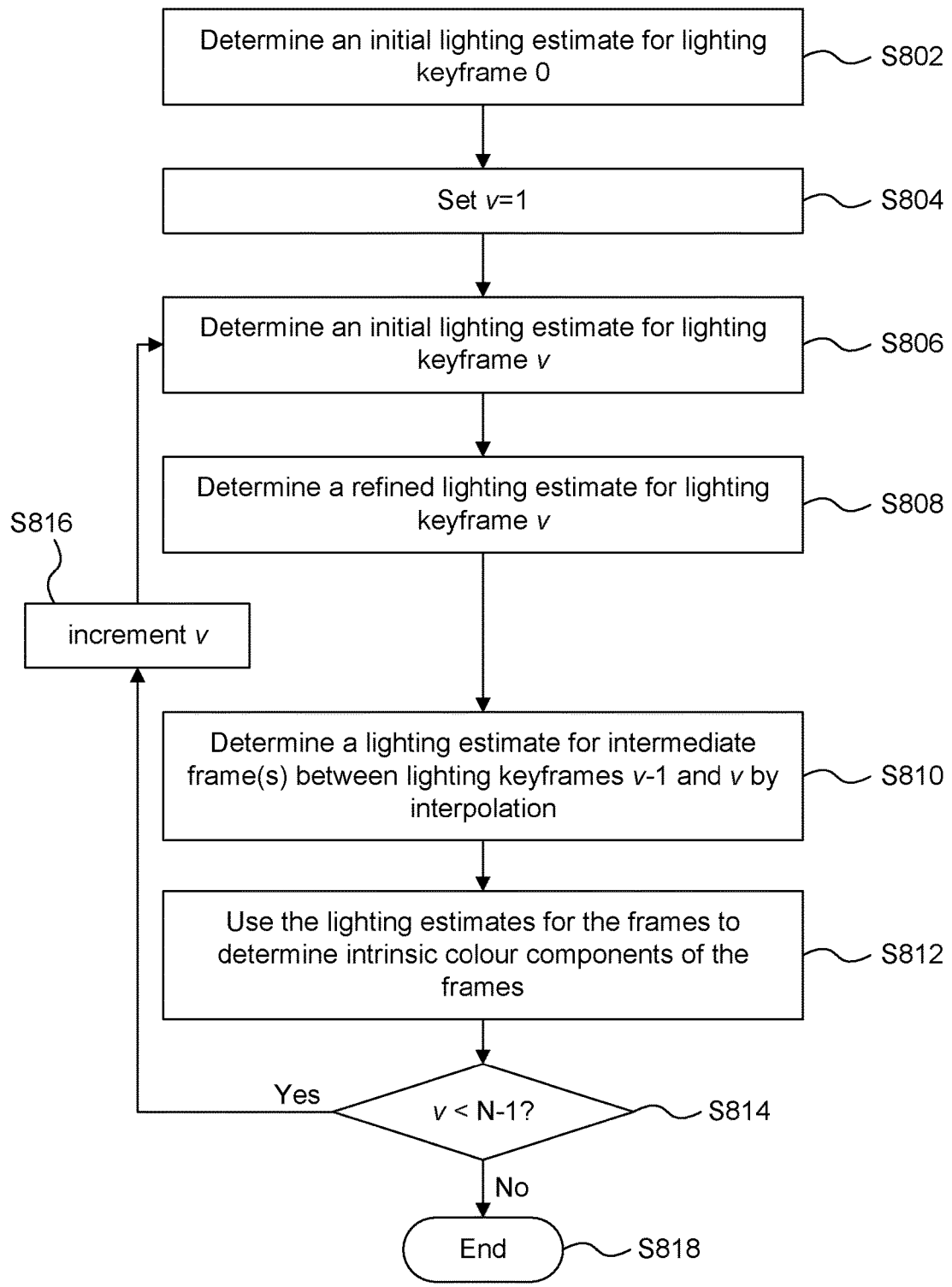
FIG. 8 is a flow chart for a method of determining lighting estimates for frames of a video sequence.

With reference to the flow chart shown in FIG. 8, a method of determining lighting estimates is now described. In step S802 the global lighting determination logic (206 or 506) determines an initial lighting estimate 704$_0$ for the lighting keyframe 0 (702$_0$). The initial lighting estimate $I_G$ for lighting keyframe 0 is determined according to any of the examples described above. As described above, the initial lighting estimate $I_G$ is defined in terms of spherical harmonic coefficients $\{k_m^l\}$ according to equation 12, and is stored in the store 112. The initial lighting estimate 704$_0$ for the first lighting keyframe 702$_0$ is used as the lighting estimate 706$_0$ for that lighting keyframe. The global lighting determination logic (206 or 506) can go on to determine lighting estimates for subsequent lighting keyframes.

In particular, in step S804 the global lighting determination logic (206 or 506) sets a time index ν to a value of 1. In step S806 the global lighting determination logic (206 or 506) determines an initial lighting estimate $704_3$ for the lighting keyframe 1 ($702_3$). The initial lighting estimate $I_G$ for lighting keyframe 1 is determined according to any of the examples described above. As described above, the initial lighting estimate $I_G$ is defined in terms of spherical harmonic coefficients $\{k_m^l\}$ according to equation 12.

Then in step S808 the global lighting determination logic (206 or 506) determines a refined lighting estimate $706_3$ for the for lighting keyframe 1 based on: (i) the initial lighting estimate ($704_3$) for the lighting keyframe 1, and (ii) the lighting estimate ($706_0$) for the lighting keyframe 0. In particular, the lighting determination logic (206 or 506) may determine the refined lighting estimate $706_3$ as a weighted sum of the initial lighting estimate $704_3$ and the lighting estimate for the previous lighting keyframe ($706_0$). Since the lighting estimates each comprise a linear combination of spherical harmonic components (in accordance with equation 12), the lighting determination logic (206 or 506) can refine different spherical harmonic coefficients ($k_m^l$) for respective spherical harmonic components ($Y_m^l$) independently to each other. FIG. 7 shows initial lighting estimates as circles with close hatching, and shows lighting estimates which are refined by other lighting estimates as circles with more sparse hatching.

Therefore, a level of temporal smoothness can be enforced by applying signal processing methods to the spherical harmonic lighting coefficient vector $\{k_m^l\}$. In particular, for lighting keyframe ν the refinement step S808 may be implemented as:

$$\bar{k}_m^l[\nu] = \beta \bar{k}_m^l[\nu-1] + (1-\beta) k_m^l[\nu] \tag{30}$$

$$\bar{k}_m^l[0] = k_m^l[0] \tag{31}$$

where $\{\bar{k}_m^l[\nu]\}$ is the set of spherical harmonic coefficients representing the refined lighting estimate (706) for lighting keyframe ν, and $\{k_m^l[\nu]\}$ is the set of spherical harmonic coefficients representing the initial lighting estimate (704) for lighting keyframe ν. Equation 31 indicates that for the very first lighting keyframe in the video sequence, i.e. if there are no lighting keyframes in the sequence prior to the lighting keyframe 0, then the lighting estimate $706_0$ for the lighting keyframe 0 is the same as the initial lighting estimate ($704_0$) for the lighting keyframe 0. The parameter β is a parameter defining the weights in the weighted sum of equation 30. Higher values of β provide more stable lighting and shading estimates, but adaptation to changes in lighting in the frames of the sequence is slower. The lighting determination logic (206 or 506) may set the weights of the weighted sum (by setting β accordingly) based on the content of the sequence of frames. For example, if the content does not involve rapid changes in lighting then a higher value for β may be set compared to if the content involves more rapid changes in lighting.

The frequency at which lighting is updated (i.e. the number of frames of the video sequence which are treated as lighting keyframes) is balanced with the computational overhead incurred in performing the lighting estimation. For example, all of the frames in the sequence may be used as lighting keyframes. In other examples (such as the example shown in FIG. 7), some but not all of the frames in the sequence are used as lighting keyframes. In the example shown in FIG. 7, one frame in every three frames of the sequence is a lighting keyframe. In other examples, more or less of the frames may be lighting keyframes. To give some examples, there may be a lighting keyframe for every 2, 5, 10, 20, 50 or 100 frames of the sequence.

The lighting estimate $706_3$ for the lighting keyframe 1 is stored in the store 112 to be used for determining lighting estimates for subsequent lighting keyframes. With reference to FIG. 7, the lighting estimates for the lighting keyframes (e.g. $706_0$ and $706_3$) are used as the final lighting estimates 708 for those frames (e.g. $708_0$ and $708_3$).

In examples, when not all of the frames of the video sequence are lighting keyframes, such as in FIG. 7, in step S810 the lighting determination logic (206 or 506) determines lighting estimates for frames of the sequence by interpolating between the lighting estimates determined for lighting keyframes. In particular, lighting estimates for intermediate frames of the sequence, positioned between the lighting keyframes (ν−1) and ν in the sequence, are determined by interpolating between the lighting estimates for the lighting keyframes (ν−1) and ν. For example, the interpolation may be linear interpolation (or any other suitable interpolation such as cubic interpolation) of the respective spherical harmonic coefficients $k_m^l$ between the lighting keyframes. Linear interpolation between keyframes is a straightforward and computationally inexpensive solution that avoids abrupt transitions in lighting estimates. In this way the lighting estimates $708_1$ and $708_2$ for frames 1 and 2 are determined based on the lighting estimates $706_0$ and $706_3$ for the lighting keyframes 0 and 1. The determined lighting estimates ($708_0$ to ($708_3$) for the frames 0 to 3 are provided to the intrinsic colour determination logic (208 or 508).

In step S812, for each of the frames for which lighting estimates are received, the intrinsic colour determination logic uses the lighting estimates to separate image values representing the objects 102 in the frame into an intrinsic colour component ρ and a shading component $I_S$, wherein the intrinsic colour component is for use in rendering the objects 102 under render lighting conditions. The operation of the intrinsic colour determination logic is described above in relation to the single frame examples, and the intrinsic colour determination logic may operate as described above for each frame of the video sequence. The determined intrinsic colour components of the frames are stored in the store 112 for subsequent use in rendering the objects 102 under render lighting conditions.

In step S814 the lighting determination logic (206 or 506) determines whether there are more lighting keyframes in the sequence. In other words, if there are N lighting keyframes in the video sequence then step S814 determines whether ν is less than N−1.

If ν is less than N−1 then there are more lighting keyframes in the sequence, so the method passes to step S816, in which ν is incremented, e.g. from ν=1 to ν=2 in the first iteration. The method then passes back to step S806, and the steps S806 to S814 are repeated. In this way an initial lighting estimate $704_6$ is determined for lighting keyframe 2 (in step S806), which is then refined in step S808 to determine the lighting estimate $706_6$, and then the lighting estimates $708_4$ and $708_5$ are determined in step S810 by interpolating between the lighting estimates $706_3$ and $706_6$ for the lighting keyframes 1 and 2. The final lighting estimate $708_6$ is the same as the lighting estimate $706_6$ for the lighting keyframe 2 ($702_6$). In step S812 the intrinsic colour determination logic uses the lighting estimates $708_4$, $708_5$ and $708_6$ to determine the intrinsic colour components representing the objects 102 in the frames 4, 5 and 6 respectively.

It is noted that step S808 may involve obtaining the lighting estimate for the lighting keyframe v−1 by retrieving the lighting estimate for the lighting keyframe v−1 from the store 112.

A time delay (e.g. at least as long as the time between lighting keyframes in the video sequence) is introduced such that when a steady stream of frames of a video sequence is being processed then it should be possible to interpolate between lighting keyframes, i.e. v is less than N−1. However, the video sequence could terminate at any point. When lighting estimates have been determined for all the lighting keyframes in the sequence then in step S814 it is determined that v is not less than N−1. If the video sequence does not end on a lighting keyframe then the frames of the video sequence after the last lighting keyframe may be determined in the same manner that lighting estimates for lighting keyframes are determined. Alternatively, the lighting estimate for the last lighting keyframe could be used for all of the frames after the last lighting keyframe in the video sequence, i.e. the lighting estimate may be fixed at the last known lighting estimate of a lighting keyframe. At this point the lighting estimates $I_G$ for the frames of the sequence have been determined and intrinsic colour components ρ for each of the frames have been determined and stored in the store 112. The method then passes from step S814 to S818, such that the method ends. A method for rendering the objects under render lighting conditions can be implemented using the intrinsic colour components, e.g. by render logic (218 or 518) as described above.

The rendered views of the objects under the render lighting conditions may be used for a number of different applications. For example, a scene may be rendered so as to appear with different lighting conditions to those present when the images are captured, e.g. with lighting from a different direction, with different coloured lighting, or with lighting representing different times of day (e.g. early morning, noon, sunset, moonlight, etc.). As another example, a view of the objects 102 may be incorporated into a different scene, and the lighting applied to the objects can be set to match the lighting of the scene into which the objects are being incorporated. To give some examples, the scene may be a real-world scene or a computer generated scene. As another example, the intrinsic appearance of the objects may be changed to be included in the rendered image. For example, if the objects represent a wooden surface, the intrinsic colour components of the objects can be adjusted (separately to the lighting effects in the image) to appear like a different type of surface, e.g. a surface made from a different material such as metal, plastic or fabric. The altered intrinsic colour component can then be relit according to the render lighting conditions for inclusion in the rendered image. This can be useful, e.g. for a user to see what objects would look like if they had a different intrinsic colour. Example uses of the rendered views of the objects for are shadow manipulation, video stylisation and material editing.

Some further optimisations may be used in the methods described herein to achieve near real-time intrinsic video frame rates on consumer graphics hardware. The method can be split into three distinct parts with no overlap in processing: (i) data acquisition and preprocessing (e.g. performed by the depth processing logic, the surface normal logic and the scene analysis logic), (ii) lighting estimation and intrinsic image refinement (e.g. performed by global lighting determination logic and intrinsic colour determination logic), and (iii) intrinsic image-based automatic image processing (e.g. relighting) and display of results (e.g. performed by the render logic) using the intrinsic colour components and surface normals determined in stages (i) and (ii). These three parts of the method can be run in separate threads and combined into a pipeline, to achieve higher throughput and processor utilisation on multi-core processors. As an example, the data acquisition stage captures the RGB and depth images, for example from a live RGBD video feed, and calculates refined surface normals and refined depth values. The second stage produces lighting, shading and albedo estimates from the filtered surface normal and depth images, which are relit in the final stage.

In the intrinsic image refinement stage, calculating the angles between vectors in RGB space (for determining θ according to equation 18) takes considerable processing time. Computing an inverse cosine is an expensive operation, so in an optimised implementation, the Euclidean distance between the normalised vectors may be used as an alternative chromaticity difference measure. This gives results that closely match those for the colour angle at a fraction of the processing time.

In the examples described above the render logic is implemented in the same device as the logic used to determine in the intrinsic colour component and surface normals. In other embodiments, the render logic could be implemented in a different device. Furthermore, the render logic could be implemented after a significant delay (e.g. minutes or days, etc.) after the image has been processed to determine the intrinsic colour component and surface normals, such that the rendering is not performed in real-time as the image(s) are captured.

Figure 9:
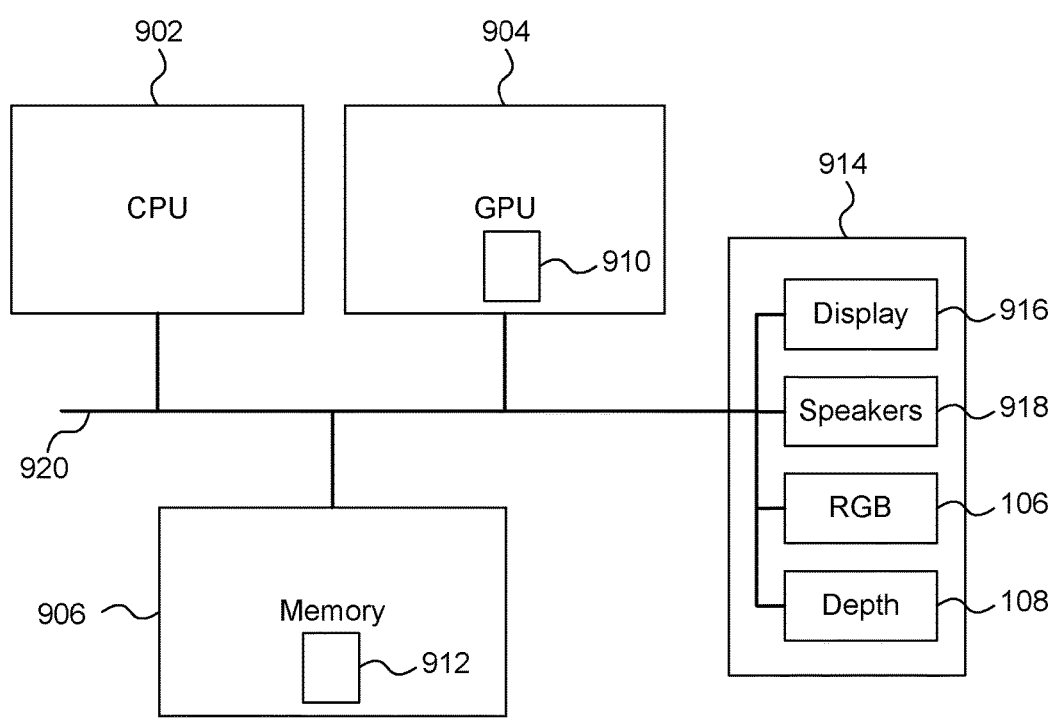
FIG. 9 shows a computer system in which an image processing system is implemented.

FIG. 9 shows a computer system in which the image processing systems described herein may be implemented. The computer system comprises a CPU 902, a GPU 904, a memory 906 and other devices 914, such as a display 916, speakers 918 and the camera 106 and depth camera 108. A processing block 910 (corresponding to processing blocks 110 or 510) is implemented on the GPU 904. In other examples, the processing block 910 may be implemented on the CPU 902. The components of the computer system can communicate with each other via a communications bus 920. A store 912 (corresponding to stores 112 or 512) is implemented as part of the memory 906. As described above, the camera 106 and the depth camera 108 can be used to capture input images and depth images respectively. Rendered images may be displayed on the display 916. In other examples, one or more of the camera 106, depth camera 108 and display 916 may be implemented on a different device to the processing block 910.

Generally, any of the functions, methods, techniques or components described above (e.g. the components of the processing blocks 110 and 510) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation of some of the components of the processing blocks 110 and 510, those components represent program code that perform specified tasks when executed on a processor. In one example, units and logic of the processing blocks 110 and 510 may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods described herein may be carried out by a dedicated circuit, an application-specific integrated circuit, a programmable logic array, a field-programmable gate array, or the like. For example, the module, functionality, component, unit or logic (e.g. the components of the processing blocks 110 and 510) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the components of the processing blocks 110 and 510) may include circuitry that is fixed function and circuitry that can be programmed to perform a function or functions; such programming may be provided from a firmware or software update or control mechanism. In an example, hardware logic has circuitry that implements a fixed function operation, state machine or process.

Figure 10:
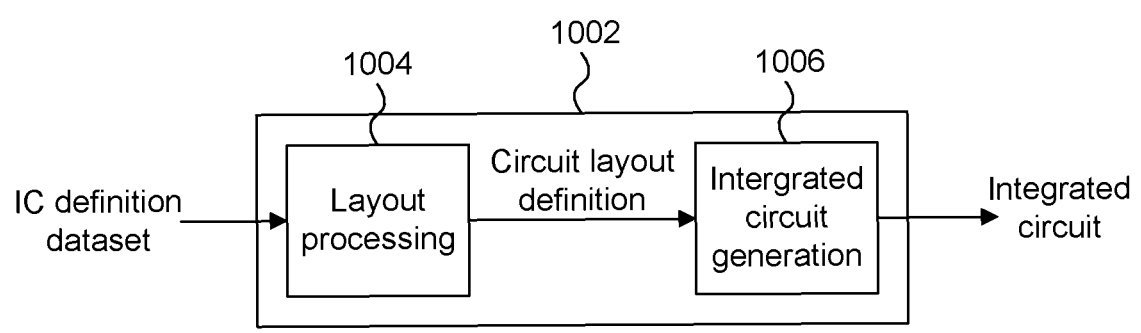
FIG. 10 shows an integrated circuit manufacturing system for generating an integrated circuit embodying an image processing system.

It is also intended to encompass software which "describes" or defines the configuration of hardware that implements a module, functionality, component, unit or logic (e.g. the components of the processing blocks 110 and 510) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an image processing system configured to perform any of the methods described herein, or to manufacture an image processing system comprising any apparatus described herein. The IC definition dataset may be in the form of computer code, e.g. written in a suitable HDL such as register-transfer level (RTL) code. FIG. 10 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining an image processing system as described in any of the examples herein), process the IC definition dataset, and generate an IC according to the IC definition dataset (e.g. which embodies an image processing system as described in any of the examples herein). The processing of the IC definition dataset configures the IC manufacturing system 1002 to manufacture an integrated circuit embodying an image processing system as described in any of the examples herein. More specifically, the layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system has determined the circuit layout it may output a circuit layout definition to the IC generation system 1006. The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC. The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. An image processing system configured to determine a set of surface normals of one or more objects for use in rendering the one or more objects, the image processing system being configured to receive one or more input images each representing a view of the one or more objects, and to receive a depth image representing depth values of the one or more objects, the image processing system comprising surface normal logic configured to:
   determine coarse surface normal estimates based on depth values of the received depth image representing depth values of the one or more objects; and
   determine the set of surface normals by applying bilateral filtering to the coarse surface normal estimates, said bilateral filtering using bilateral filtering guidance terms based on luminance values derived from the received one or more input images, the determined set of surface normals being for use in rendering the one or more objects.

2. The image processing system of claim 1 wherein the surface normal logic is configured to determine the coarse surface normal estimates based on differences between depth values of the received depth image.

3. The image processing system of claim 1 wherein values of each of the one or more input images are separable into an intrinsic colour component and a shading component, and wherein the image processing system further comprises processing logic configured to use the set of surface normals to determine the intrinsic colour component of the one or more objects for use in the rendering of the one or more objects.

4. The image processing system of claim 3 wherein the processing logic comprises:
   scene analysis logic configured to determine a plurality of segments of the one or more objects;
   global lighting determination logic configured to:
   determine representative intrinsic colour estimates for each of the segments, in accordance with the values of the one or more input images and the determined set of surface normals, wherein the representative intrinsic colour estimates are determined so as to minimise differences in corresponding shading estimates between different segments for overlapping surface normal directions; and
   determine a global lighting estimate using the values of the input image and the determined representative intrinsic colour estimates for the segments; and
   intrinsic colour determination logic configured to determining said intrinsic colour component in accordance with the values of the one or more input images and the determined global lighting estimate.

5. The image processing system of claim 1 wherein the determined set of surface normals of the one or more objects are for use in rendering the one or more objects under render lighting conditions.

6. The image processing system of claim 1 wherein the image processing system is embodied in hardware on an integrated circuit.

7. A method of determining a set of surface normals of one or more objects for use in rendering the one or more objects, the method comprising:
   receiving one or more input images each representing a view of the one or more objects;
   receiving a depth image representing depth values of the one or more objects;
   determining coarse surface normal estimates based on depth values of the received depth image; and
   determining the set of surface normals by applying bilateral filtering to the coarse surface normal estimates, said bilateral filtering using bilateral filtering guidance terms based on luminance values derived from the input image, the determined set of surface normals being for use in rendering the one or more objects.

8. The method of claim 7 wherein the coarse surface normal estimates are determined based on differences between depth values of the received depth image.

9. The method of claim 7 wherein values of each of the one or more input images are separable into an intrinsic colour component and a shading component, and wherein the method further comprises using the set of surface normals to determine the intrinsic colour component of the one or more objects for use in the rendering of the one or more objects.

10. The method of claim 9 wherein said using the set of surface normals to determine the intrinsic colour component of the one or more objects comprises:
    determining a plurality of segments of the one or more objects;
    in accordance with the values of the one or more input images and the determined set of surface normals, determining representative intrinsic colour estimates for each of the segments, wherein the representative intrinsic colour estimates are determined so as to minimise differences in corresponding shading estimates between different segments for overlapping surface normal directions;
    determining a global lighting estimate using the values of the input image and the determined representative intrinsic colour estimates for the segments; and
    in accordance with the values of the one or more input images and the determined global lighting estimate, determining said intrinsic colour component.

11. The method of claim 7 wherein the determined set of surface normals of the one or more objects are for use in rendering the one or more objects under render lighting conditions.

12. A non-transitory computer readable storage medium having stored thereon processor executable instructions that when executed cause at least one processor to determine a set of surface normals of one or more objects for use in rendering the one or more objects, the determining a set of surface normals comprising:
    receiving one or more input images each representing a view of the one or more objects;
    receiving a depth image representing depth values of the one or more objects;
    determining coarse surface normal estimates based on depth values of the received depth image; and
    determining the set of surface normals by applying bilateral filtering to the coarse surface normal estimates, said bilateral filtering using bilateral filtering guidance terms based on luminance values derived from the input image, the determined set of surface normals being for use in rendering the one or more objects.

* * * * *